United States Patent
Liu et al.

(10) Patent No.: US 11,640,710 B2
(45) Date of Patent: May 2, 2023

(54) WEAKLY-SUPERVISED ACTION LOCALIZATION BY SPARSE TEMPORAL POOLING NETWORK

(71) Applicant: Google LLC, Mountain View, CA (US)

(72) Inventors: Ting Liu, Playa Vista, CA (US); Gautam Prasad, Los Angeles, CA (US); Phuc Xuan Nguyen, San Francisco, CA (US); Bohyung Han, Seoul (KR)

(73) Assignee: GOOGLE LLC, Mountain View, CA (US)

( * ) Notice: Subject to any disclaimer, the term of this patent is extended or adjusted under 35 U.S.C. 154(b) by 337 days.

(21) Appl. No.: 16/625,172

(22) PCT Filed: Nov. 5, 2018

(86) PCT No.: PCT/US2018/059176
§ 371 (c)(1),
(2) Date: Dec. 20, 2019

(87) PCT Pub. No.: WO2019/099226
PCT Pub. Date: May 23, 2019

(65) Prior Publication Data
US 2020/0272823 A1    Aug. 27, 2020

Related U.S. Application Data

(60) Provisional application No. 62/586,078, filed on Nov. 14, 2017.

(51) Int. Cl.
*G06V 20/40* (2022.01)
*G06K 9/62* (2022.01)

(52) U.S. Cl.
CPC ........... *G06V 20/40* (2022.01); *G06K 9/6256* (2013.01); *G06K 9/6281* (2013.01); *G06V 20/44* (2022.01)

(58) Field of Classification Search
CPC ............... G06K 9/6256; G06K 9/6281; G06V 20/40–49
See application file for complete search history.

(56) References Cited

FOREIGN PATENT DOCUMENTS

CN    107203781    9/2017

OTHER PUBLICATIONS

Xinggang Wang, et al. "Revisiting multiple instance neural networks.", arXiv:1610.02501v1, (2016) (Year: 2016).*
(Continued)

*Primary Examiner* — Amandeep Saini
*Assistant Examiner* — Raphael Schwartz
(74) *Attorney, Agent, or Firm* — Dority & Manning, P.A.

(57) ABSTRACT

Systems and methods for a weakly supervised action localization model are provided. Example models according to example aspects of the present disclosure can localize and/or classify actions in untrimmed videos using machine-learned models, such as convolutional neural networks. The example models can predict temporal intervals of human actions given video-level class labels with no requirement of temporal localization information of actions. The example models can recognize actions and identify a sparse set of keyframes associated with actions through adaptive temporal pooling of video frames, wherein the loss function of the model is composed of a classification error and a sparsity of frame selection. Following action recognition with sparse keyframe attention, temporal proposals for action can be extracted using temporal class activation mappings, and final time intervals can be estimated corresponding to target actions.

28 Claims, 12 Drawing Sheets

(56) References Cited

OTHER PUBLICATIONS

Zhou, "An End-to-End Sparse Coding", ICML 2017 Workshop on Principled Approaches to Deep Learning, Aug. 2017 (Year: 2017).*
International Search Report and Written Opinion for PCT/US2018/059176, dated Apr. 12, 2019, 15 pages.
Liu et al., "Weakly Supervised Action Localization by Sparse Temporal Pooling Network", arXiv.org:1712.05080v2, 10 pages.
Nguyen et al., "Weakly Supervised Action Localization by Sparse Temporal Pooling Network", 2018 IEEE Conference on Computer Vision and Pattern Recognition, Jun. 18, 2018, 10 pages.
Wang et al., "Temporal Segment Networks: Towards Good Practices for Deep Action Recognition", Serious Games, vol. 9912, Jan. 1, 2016, pp. 20-36.
Wang et al., "UntrimmedNets for Weakly Supervised Action Recognition and Detection", arXiv.org/1611.07004v2, Jul. 1, 2017, 10 pages.
Activity Net: Large Scale Activity Recognition Challenge, 2016, http://activity-net.org/challenges/2016/index.html, retrieved on Apr. 16, 2020, 2 pages.
Alwassel et al, "Action Search: Learning to Search for Human Activities in Untrimmed Videos", arXiv:1706v1, Jun. 13, 2017.
Bilen et al, "Weakly Supervised Deep Detection Networks", arXiv:1511v4, Dec. 19, 2016, 9 pages.
Buch et al, "SST: Single-Stream Temporal Action Proposals", Conference on Computer Vision and Pattern Recognition, Jul. 21-26, 2017, Honolulu, Hawaii, 10 pages.
Carreira et al, "Quo Vadis, Action Recognition? A New Model and the Kinetics Dataset", arXiv:1705v3, Feb. 12, 2018, 10 pages.
Deng et al, "ImageNet: A Large-Scale Hierarchical Image Database", 8 pages.
Escorcia et al, "DAPs: Deep Action Proposals for Action Understanding", European Conference on Computer Vision and Pattern Recognition, Oct. 11-14, 2016, Amsterdam, The Netherlands, 17 pages.
Feichtenhofer et al, "Convolutional Two-Stream Network Fusion for Video Action Recognition", arXiv:1604v2, Sep. 26, 2016, 9 pages.
Feichtenhofer et al, "Spatiotemporal Multiplier Networks for Video Action Recognition", Conference on Computer Vision and Pattern Recognition, Jul. 21-26, 2017, Honolulu, Hawaii, 10 pages.
Feichtenhofer et al, "Spatiotemporal Residual Networks for Video Action Recognition", arXiv:1611v1, Nov. 7, 2016, 9 pages.
Girdhar et al, "ActionVLAD: Learning Spatio-Temporal Aggregation for Action Classification", arXiv:1704v1, Apr. 10, 2017, 14 pages.
Girshick et al, "Rich Feature Hierarchies for Accurate Object Detection and Semantic Segmentation", arXiv:1311v5, Oct. 22, 2014, 21 pages.
Gkioxari et al, "Finding Action Tubes", Conference on Computer Vision and Pattern Recognition, Jun. 8-12, 2015, Boston, Massachusetts, pp. 759-768.
Gu Et Al, "AVA: A Video Dataset of Spatio-Temporally Localized Atomic Visual Actions", arXiv:1705v4, Apr. 30, 2108, 15 pages.
Heilbron et al, "ActivityNet: A Large-Scale Video Benchmark for Human Activity Understanding", Conference on Computer Vision and Patient Recognition, Jun. 8-12, 2015, Boston, Massachusetts, pp. 961-970.
Heilbron et al, "Fast Temporal Activity Proposals for Efficient Detection of Human Actions in Untrimmed Videos", Conference on Computer Vision and Pattern Recognition, Jun. 26-Jul. 1, 2016, pp. 1914-1923.
Huang et al, "Connectionist Temporal Modeling for Weakly Supervised Action Labeling", arXiv:1607v1, Jul. 28, 2016, 17 pages.
Karpathy et al, "Large-Scale Video Classification with Convolutional Neural Networks", Conference on Computer Vision and Pattern Recognition, Sep. 6-12, 2014, 8 pages.
Kay et al, "The Kinetics Human Action Video Dataset", arXiv:1705v1, May 19, 2017, 22 pages.

Kuehne et al, "HMDB: A Large Video Database for Human Motion Recognition", Conference on Computer Vision and Pattern Recognition, May 25-27, 2011, Narita, Japan, pp. 2556-2563.
Laptev, "On Space-Time Interest Points", International Journal of Computer Vision, vol. 64, No. 2/3, 2005, 17 pages.
Ma et al, "Learning Activity Progression in LSTMs for Activity Detection and Early Detection", Conference on Computer Vision and Pattern Recognition, Jun. 26-Jul. 1, 2016, pp. 1942-1950.
Montes et al, "Temporal Activity Detection in Untrimmed Videos with Recurrent Neural Networks", Conference on Neural Information Processing Systems, Dec. 5-10, 2016, Barcelona, Spain, 5 pages.
Nguyen et al, "Weakly Supervised Action Localization by Sparse Temporal Pooling Network", arXiv:1712v2, Apr. 3, 2018, 10 pages.
Richard et al, "Temporal Action Detection Using a Statistical Language Model", Conference on Computer Vision and Pattern Recognition, Jun. 26-Jul. 1, 2016, pp. 3131-3140.
Richard et al, "Weakly Supervised Action Learning with RNN based Fine-to-Course Modeling", arXiv:1703v3, Oct. 9, 2017, 10 pages.
Shi et al, "Learning Long-Term Dependencies for Action Recognition with a Biologically-Inspired Deep Network", arXiv:1611v3, Mar. 19, 2017, 10 pages.
Shou et al, "CDC: Convolutional-de-Convolutional Networks for Precise Temporal Action Localization in Untrimmed Videos", Conference on Computer Vision and Pattern Recognition, Oct. 22-29, 2017, Venice, Italy, pp. 5734-5743.
Shou et al, "Temporal Action Localization in Untrimmed Videos via Multi-Stage CNNs", arXiv:1601v2, Apr. 21, 2016, 10 pages.
Simonyan et al, "Two-Stream Convolutional Networks for Action Recognition in Videos", Conference on Neural Information Processing Systems, Dec. 8-13, 2014, Montreal, Canada, 9 pages.
Singh et al, "A Multi-Stream Bi-Directional Recurrent Neural Network for Finegrained Action Detection", Conference on Computer Vision and Pattern Recognition, Oct. 11-14, 2016, Amsterdam, The Netherlands, 10 pages.
Singh et al, "Hide-and-Seek: Forcing a Network to be Meticulous for Weakly-Supervised Object and Action Localization", arXiv:1704v2, Dec. 23, 2017, 10 pages.
Singh et al, "Untrimmed Video Classification for Activity Detection: Submission to ActivityNet Challenge", arXiv:1607v2, Jul. 12, 2016, 4 pages.
Soomro et al, "Action Localization in Videos Through Context Walk", Conference on Computer Vision and Pattern Recognition, Jun. 7-12, 2015, Boston, Massachusetts, pp. 3280-3288.
Soomro et al, "UCF101: A Dataset of 101 Human Action Classes from Videos in the Wild", Technical Report, Center for Research in Computer Vision, University of Central Florida, Nov. 2012, 7 pages.
THUMOS Challenge 2014, https://www.crcv.ucf.edu/THUMOS14/results.html, retrieved on Apr. 16, 2020, Action Recognition with a Large Number of Classes, 28 pages.
Tran et al, "Learning Spatiotemporal Features with 3D Convolutional Networks", arXiv:1412v4, Oct. 7, 2015, 16 pages.
Wang et al, "Action Recognition with Improved Trajectories", International Conference on Computer Vision, Dec. 2013, Sydney, Australia, pp. 3551-3558.
Wang et al, "Actionness Estimation Using Hybrid Fully Convolutional Networks", Conference on Computer Vision and Pattern Recognition, Jun. 26-Jul. 1, 2016, pp. 2708-2717.
Wang et al, "Motionlets: Mid-Level 3D Parts for Human Motion Recognition", Conference on Computer Vision and Pattern Recognition, Jun. 25-27, 2013, pp. 2674-2681.
Wang et al, "Spatiotemporal Pyramid Network for Video Action Recognition", arXiv:1903v1, Mar. 4, 2019, 10 pages.
Wang et al, "Temporal Segment Networks: Towards Good Practices for Deep Action Recognition", arXiv:1608v1, Aug. 2, 2016, 16 pages.
Wang et al, "UntrimmedNets for Weakly Supervised Action Recognition and Detection", arXiv:1703v2, May 22, 2017, 1 page.
Wedel et al, "An Improved Algorithm for TV-L1 Optical Flow", Statistical and Geometrical Approaches to Visual Motion Analysis, 23 pages.

(56) References Cited

OTHER PUBLICATIONS

Xiong et al, "A Pursuit of Temporal Accuracy in General Activity Detection", arXiv:1703v1, Mar. 8, 2017, 10 pages.
Xu et al, "R-C3D: Region Convolutional 3D Network for Temporal Activity Detection", arXiv:1703v2, Aug. 4, 2017, 10 pages.
Yeung et al, "End-to-End Learning of Action Detection from Frame Glimpses in Videos", arXiv:1511v2, Mar. 13, 2017, 10 pages.
Yuan et al, "Temporal Action Localization bv Structured Maximal Sums", Conference on Computer Vision and Pattern Recognition, Oct. 22-29, 2017, Venice, Italy, pp. 3684-3692.
Yuan et al, "Temporal Action Localization with Pyramid of Score Distribution Features", Conference on Computer Vision and Pattern Recognition, Jun. 26-Jul. 1, 2016, pp. 3093-3102.
Zhao et al, "Temporal Action Detection with Structured Segment Networks", arXiv:1704v2, Sep. 18, 2017, 10 pages.
Zhou et al, "Learning Deep Features for Discriminative Localization", arXiv:1512v1, Dec. 14, 2015, 10 pages.
International Preliminary Report on Patentability for Application No. PCT/US2018/059176, dated May 28, 2020, 10 pages.
Zhi-Hua Zhou, "A Brief Introduction to Weakly Supervised Learning", National Science Review, vol. 5, pp. 44-53.
Chinese Search Report Corresponding to Application No. 201880044507 dated Feb. 20, 2023.

\* cited by examiner

US 11,640,710 B2

WEAKLY-SUPERVISED ACTION LOCALIZATION BY SPARSE TEMPORAL POOLING NETWORK

PRIORITY CLAIM

This application is based upon and claims the right of priority under 35 U.S.C. § 371 to International Application No. PCT/US2018/059176 filed on Nov. 5, 2018, which claims the benefit of U.S. Provisional Application Ser. No. 62/586,078 filed Nov. 14, 2017. Applicant claims priority to and the benefit of each of such applications and incorporates all such applications herein by reference in their entirety.

FIELD

The present disclosure relates generally to video action detection and localization. More particularly, the present disclosure relates to a weakly-supervised temporal action localization model for untrimmed videos.

BACKGROUND

Action recognition in videos is one of the critical problems for high-level video understanding including event detection, video summarization, and visual question answering in videos. Many researchers have been investigating the problem extensively in the last decade. The main challenge in action recognition is a lack of appropriate representation methods of videos. Contrary to the almost immediate success of convolutional neural networks (CNNs) in many visual recognition problems related to images, applying deep neural networks to video data is not straightforward due to a number of issues including the inherently complex structures of data, large file sizes, and lack of knowledge for modeling temporal information. Hence, techniques based on the representations from deep learning have not been particularly better than methods relying on hand-crafted visual features. As a result, many existing algorithms attempt to achieve the state-of-the-art performance by combining hand-crafted and learned/trained features.

Another issue is that most existing techniques assume trimmed videos for video-level text classification or require annotations of action intervals for temporal localization. Since an untrimmed video typically contains a large number of irrelevant frames directly related to the video level class labels, both video representation learning and action classification are likely to fail in extracting necessary information from raw videos. On the other hand, annotating a large scale dataset for action localization is prohibitively expensive and time-consuming, and thus it would be more desirable to develop competitive algorithms running without such temporal annotations.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for temporally localizing a target action in a video. The computer-implemented method can include inputting a video comprising a RGB stream into a sparse temporal pooling network. The sparse temporal pooling network can include a first weakly supervised temporal action localization model and a second weakly supervised temporal action localization model. The computer-implemented method can further include determining, by the sparse temporal pooling network, an optical flow stream of the video. The computer-implemented method can further include analyzing the RGB stream by the first weakly-supervised temporal action localization model to determine an RGB weighted temporal class activation map comprising a one dimensional class-specific activation map in a temporal domain. The computer-implemented method can further include analyzing the optical flow stream by the second weakly-supervised temporal action localization model to determine a flow weighted temporal class activation map comprising a one dimensional class-specific activation map in the temporal domain. The computer-implemented method can further include determining, by the sparse temporal pooling network, a temporal location of a target action in the video based at least in part on the RGB weighted temporal class activation map or the flow weighted temporal class activation map.

Another example aspect of the present disclosure is directed to a computer-implemented method of training a weakly supervised temporal action localization model. The computer-implemented method can include inputting an untrimmed video into the weakly supervised temporal action localization model. The computer-implemented method can further include analyzing the untrimmed video by the weakly supervised temporal action localization model to determine a predicted score for an action classification. The computer-implemented method can further include determining a loss function based at least in part on the predicted score. The loss function can include a sparsity loss and a classification loss. The computer-implemented method can further include training the weakly supervised temporal action localization model based at least in part on the loss function.

Another example aspect of the present disclosure is directed to a computing system. The computing system can include at least one processor, a sparse temporal pooling network, and at least one tangible, non-transitory computer-readable medium that stores instructions that, when executed by the at least one processor, cause the at least one processor to perform operations. The sparse temporal pooling network can include a first weakly supervised temporal action localization model and a second weakly supervised temporal action localization model. The first weakly supervised temporal action localization model can be trained to receive a video comprising a RGB stream and, in response to receipt of the RGB stream, output a RGB weighted temporal class activation map comprising a one dimensional class-specific activation map in a temporal domain. The second weakly supervised temporal action localization model can be trained to receive an optical flow stream of the video and in response to receipt of the optical flow stream, output a flow weighted temporal class activation map comprising a one dimensional class-specific activation map in a temporal domain. The operations can include obtaining the video. The operations can further include generating the optical flow stream based at least in part on the RGB stream. The operations can further include inputting the RGB stream into the first weakly supervised temporal action localization model. The operations can further include receiving, as an output of the first weakly supervised temporal action localization model, the RGB weighted temporal class activation map. The operations can further include inputting the optical flow stream into the second weakly supervised temporal action localization model. The operations can further include receiving, as an output of the second weakly supervised temporal action localization model, the flow weighted temporal class activation map. The operations can further include determining a temporal location of a target action in the video based at least in part on the RGB weighted temporal class activation map or the flow weighted temporal class activation map.

Additional aspects of the present disclosure are directed to various models, computer-implemented methods, computing devices, systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
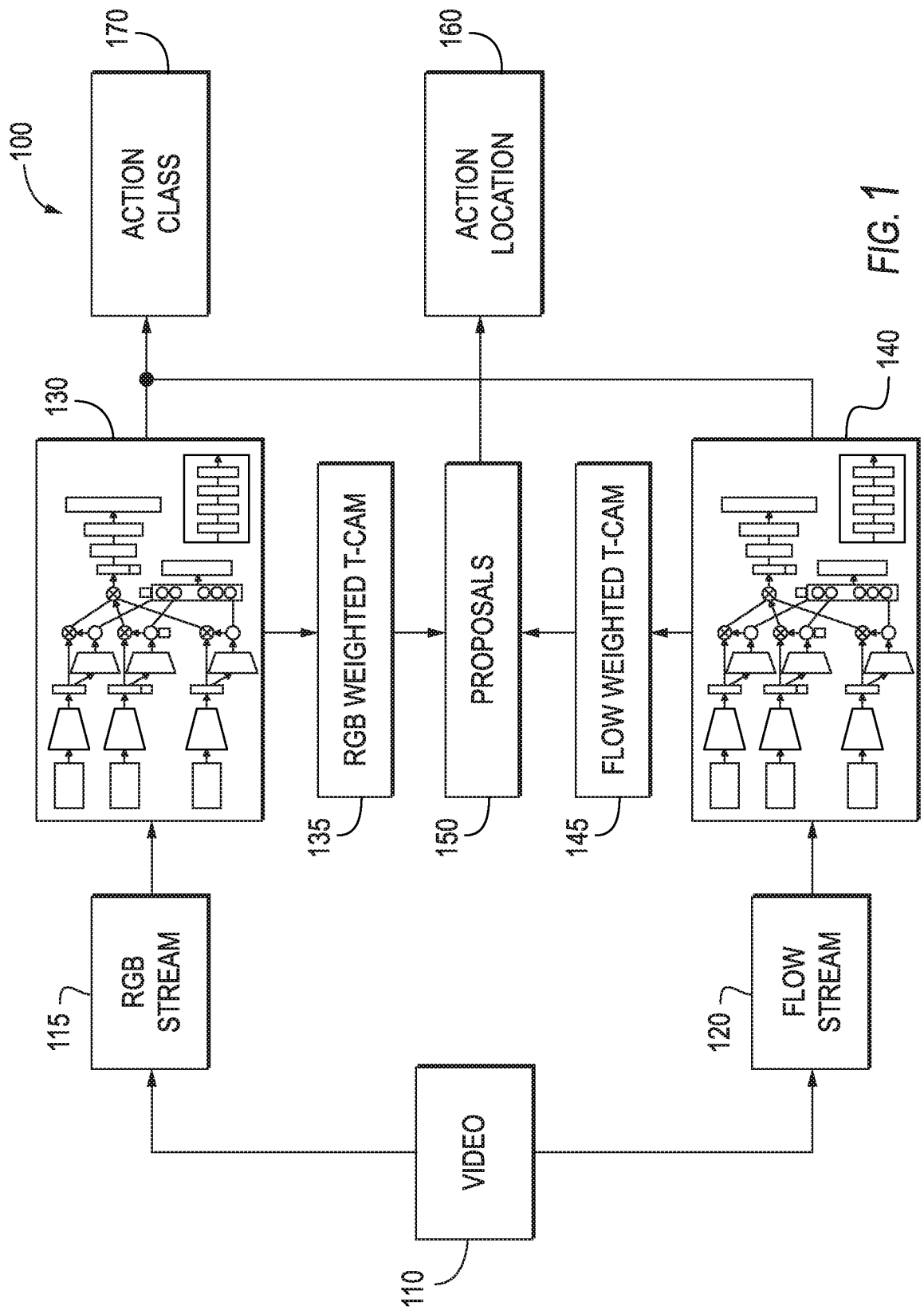
FIG. 1 depicts a block diagram of an example sparse temporal pooling network according to example aspects of the present disclosure.

Reference numerals that are repeated across plural figures are intended to identify the same features in various implementations.

DETAILED DESCRIPTION

Overview

Generally, example aspects of the present disclosure are directed to models, computer-implemented methods, computing devices, non-transitory, computer-readable media, systems, and methods for localizing action in video using a deep neural network. The example models, systems, methods, and devices of the present disclosure can allow for localizing actions in untrimmed videos temporally, without exploiting any temporal information of actions during training. The example models, systems, methods, and devices of the present disclosure can learn/be trained based on video-level text labels for individual videos. To this end, a network model (e.g., a deep neural network) can select a subset of frames useful for action recognition, where the loss function can measure classification error and sparsity of frame selection per video. For localization, Temporal Class Activation Mappings (T-CAMs) can be employed to generate one dimensional temporal action proposals from which target actions can be localized in a temporal domain. An overview of an example sparse temporal pooling network according to aspects of the present disclosure is illustrated in FIG. 1.

As shown in FIG. 1, an example sparse temporal pooling network 100 according to example aspects of the present disclosure can include two weakly supervised temporal action localization models 130/140. The sparse temporal pooling network 100 can receive a two-stream input for a video 110 and perform action classification 170 and localization 160 at the same time. For localization 160, the weighted T-CAMs 135/145 can be computed from the two streams 115/120 by the weakly supervised temporal localization models 130/140 and employed to generate one dimension temporal action proposals 150 from which target actions can be localized (at 160) in the temporal domain.

The systems and methods described herein may provide a number of technical effects and benefits. For example, a principled deep neural network architecture for weakly supervised action recognition and localization on untrimmed videos 110 depicted in FIG. 1 can allow for actions to be detected with a sparse subset of frames. Further, example aspects of the present disclosure provide for a technique to compute weighted T-CAMS 135/145 and temporal action proposals 150 using the learned/trained network 100 for localizing target actions. Further, example aspects of the present disclosure show state-of-the-art performance on THUMOS14 and have been tested on ActivityNet1.3 for future reference.

Proper video datasets may be needed to train models for action detection and recognition. For example, there are various existing datasets for action recognition such as UCF101, Sports-1M, HMDB51, AVA, and Kinetics. However, such training video datasets may include only trimmed videos, where target actions appear in all frames within videos, and/or may provide bounding boxes associated with actions. Further, such video training datasets may contain background frames with annotations about which frames are relevant to target actions.

Action recognition aims to identify a single or multiple actions per video, which is often formulated as a simple classification problem. There has been a long history for this problem, and the algorithm based on improved dense trajectories presented outstanding performance among many algorithms before deep learning started to be used actively. Convolutional neural networks have been very successful in many computer vision problems, and have been applied to the action recognition problem as well. There are several algorithms focusing on representation learning for videos and applying the learned representations to action recognition. For example, two-stream networks and 3D convolutional neural networks (C3D) are popular solutions for video representation, and those techniques and their variations have been widely used for action recognition. Recently, a combination of two-stream network and 3D convolution, referred to as I3D, has been proposed as a generic video representation method. On the other hand, many algorithms develop technologies to learn actions based on existing representation methods.

Action detection and localization, however, is a slightly different problem from action recognition because it is required to extract temporal or spatio-temporal volumes containing target actions. Most algorithms for this task are based on supervised learning, and employ temporal or spatio-temporal localization annotations of actions. There are a lot of existing algorithms based on deep learning, which include, for example, structured segment network, localizing actions by learning contextual relations, multi-stage CNNs, temporal association of frame-level action detections and techniques using recurrent neural networks. To deal with action detection and localization problems, many algorithms rely on action proposals, which are an extension of object proposals in images.

There are only a few approaches based on weakly supervised learning, which relies on video-level labels to localize actions in the temporal space. For example, UntrimmedNets extracts proposals first to recognize and detect actions, where dense temporal attention weights are obtained and softmax functions are applied to the proposals for temporal action localization by thresholding. The use of softmax function across proposals is not effective to detect multiple instances. Hide-and-seek applies the same technique—hiding random regions to force attention learning—to weakly supervised object detection and action localization. This method works well in spatial localization but is not effective in the temporal domain. Both algorithms are motivated by recent success in weakly supervised object localization; in particular, the formulation of UntrimmedNets relies heavily on object detection.

Example aspects of the present disclosure are directed to a weakly supervised temporal action localization model 200 based only on video-level action labels. This is achieved by designing a deep neural network for video classification based on a sparse subset of frames and identifying time intervals relevant to target classes.

Figure 2:
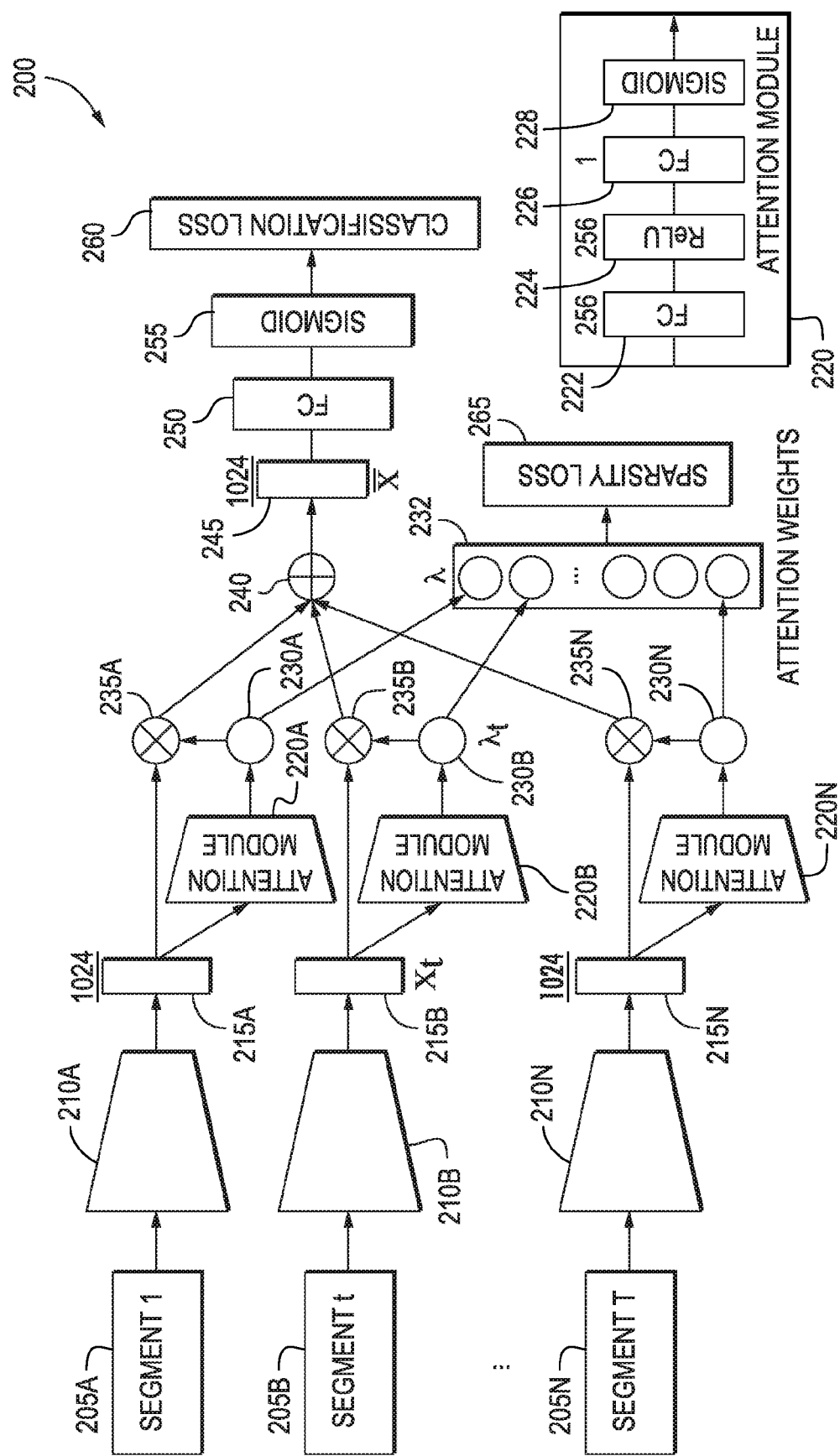
FIG. 2 depicts a block diagram of an example weakly supervised temporal action localization model according to example aspects of the present disclosure.

For example, an action can be composed of a sequence of atomic actions and can be recognized by identifying a series of keyframes corresponding to atomic actions in a video. Example models according to example aspects of the present disclosure can provide for deep neural networks to predict class labels per video using a subset of representative and unique frames to target action, which can be selected automatically from an input video. The example models according to example aspects of the present disclosure can be designed for classification but can have the capability to measure the importance of each frame in predicting classification labels. After finding the relevant classes in each video, temporal intervals corresponding to the identified actions can be estimated by computing temporal attention of individual frames, generating temporal action proposals, and aggregating relevant proposals. The present disclosure relies on video-level class labels only to perform temporal action localization and presents a principled way to extract keyframes and determine appropriate time intervals corresponding to target actions. Thus, it is possible to recognize and localize multiple actions in a single video using example aspects of the present disclosure. The overall architecture of an example weakly supervised temporal action localization model 200 according to example aspects of the present disclosure is illustrated in FIG. 2. In some implementations, the weakly supervised temporal action localization model 200 can be a standalone sparse temporal pooling network, such as a sparse temporal pooling network 100 shown in FIG. 1.

As shown, feature representations 215A-N from a set of uniformly sampled video segments 205 A-N can be extracted using one or more pretrained models 210A-N (e.g., deep neural networks such as convolutional neural networks). The attention module(s) 220A-N can generate attention weights 230A-N corresponding to individual representations 215A-N, which can be employed to compute a video-level representation 245 by temporal weighted average pooling (at 240). The video-level representation 245 can be given to a classification module 250/255, and a $l_1$ loss can be placed upon the attention weight vector 232 to enforce sparsity constraint.

To estimate a class label per video, example aspects of the present disclosure can first sample a set of video segments 205A-N from an input video (e.g., an untrimmed video 110), and extract a feature representation 215A-N from each segment 205A-N using a model 210A-N (e.g., convolutional neural networks). Each of these representations 215A-N can then be fed to an attention module 220 that consists of two fully connected ("FC") layers 222/226 and a Rectified Linear Unit 224 ("ReLU") layer located between the two FC layers 222/226. The output of the second FC layer 226 can be given to a sigmoid function 228 forcing the generated attention weights 230A-N to be normalized between 0 and 1. These attention weights 230A-N can then be used to modulate the temporal average pooling. Specifically, each of the attention weights 230A-N can be multiplied (at 235A-N) by its corresponding feature vector 215A-N. These feature vectors can then be averaged (at 240) to create the video-level representation 245. This representation can then be passed through a fully connected layer 250 and sigmoid layer 255 to obtain the class scores.

For example, $x_t \in \mathbb{R}^m$ can be the m dimensional feature representation 215A-N extracted from a video segment 205A-N centered at time t, and $\lambda_t$ be the corresponding attention weight 230A-N. The video-level representation 245, denoted by $\bar{x}$, can correspond to an attention weighted temporal average pooling, which can be given by Equation (1):

$$\bar{x} = \sum_{t=1}^{T} \lambda_t x_t \qquad (1)$$

where $\lambda=(\lambda_1, \ldots, \lambda_T)$ can be a vector 232 of the scalar outputs of sigmoid functions 228 to normalize the range of activations, and T can be the number of video segments 205A-N considered together for classification. The attention weight vector $\lambda$ (232) can be learned with a sparsity constraint 265 in a class agnostic way. This can be useful to identify frames relevant to any action and estimate time intervals for action candidates, as disclosed herein.

The loss function in the proposed model 200 can be composed of two terms, classification losses 260 and sparsity losses 265, which can be given by Equation (2):

$$\mathcal{L} = \mathcal{L}_{class} + \beta \cdot \mathcal{L}_{sparsity} \qquad (2)$$

where $\mathcal{L}_{class}$ denotes a classification loss 260 computed on the video level, $\mathcal{L}_{sparsity}$ can be sparsity loss 265, and can be a constant to control trade-off between the two terms. The classification loss 260 can be based on the standard cross-entropy loss between groundtruth and x (after passing through a few layers 250/255 as illustrated in FIG. 2) while the sparsity loss 265 can be given by determining the $l_1$ norm on the attention weights $\|\lambda\|_1$. A sigmoid function 228 can be applied to each attention weight $\lambda_t$ (230A-N), and all attention weights 230A-N can be likely to have near 0-1 binary values by $l_1$ loss. Note that integrating the sparsity loss 265 is indicative that an action can be recognized with a sparse subset of keyframes in videos.

To identify time intervals corresponding to target actions, a sufficient number of candidates can be extracted. A one dimensional class activation mapping in the temporal domain can be derived, which can be referred to as Temporal Class Activation Mapping (T-CAM). Denote by $w^c(k)$, the k-th element in the classification parameter, w, corresponding to class c. The input to the final sigmoid layer 255 for class c can be given by Equation (3):

$$s^c = \sum_{k=1}^{m} w^c(k)\bar{x}(k)$$
$$= \sum_{k=1}^{m} w^c(k) \sum_{t=1}^{T} \lambda_t x_t(k) \qquad (3)$$
$$= \sum_{t=1}^{T} \lambda_t \sum_{k=1}^{m} w^c(k)x_t(k)$$

T-CAM, denoted by $a_t=(a_t^1, a_t^2, \ldots, a_t^C)^T$, can indicate the relevance of the representation to individual classes at time step t, where each element $a_t^c$ for class c (c=1, ..., C) is given by Equation (4):

$$a_t^c = \sum_{k=1}^{m} w^c(k)x_t(k) \qquad (4)$$

Figure 3:
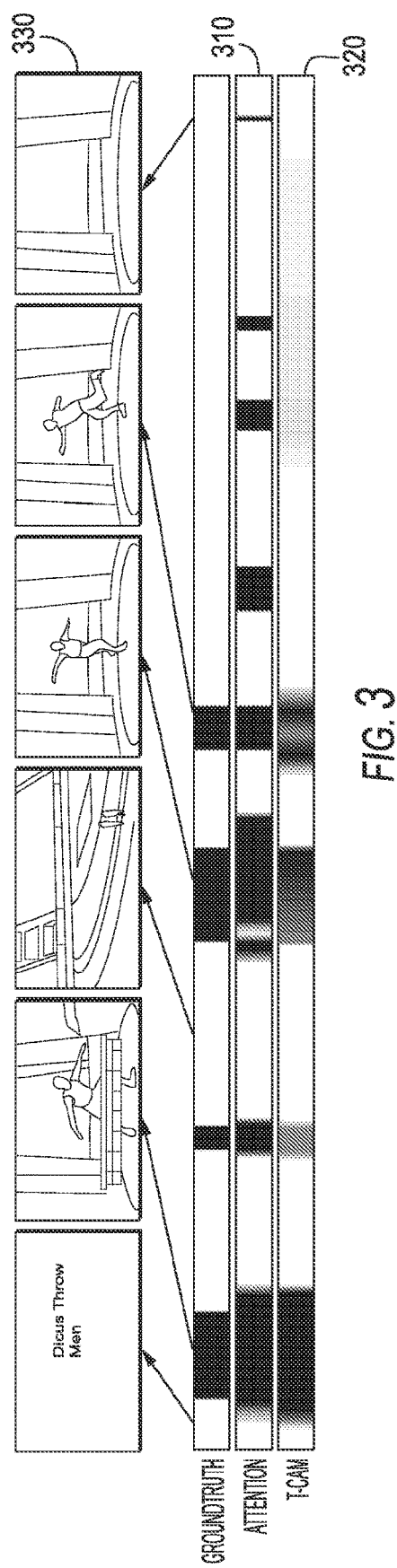
FIG. 3 depicts an illustration of example groundtruth actions and corresponding attention weights and temporal class activation map outputs using one or more example models according to example aspects of the present disclosure.

FIG. 3 illustrates examples of attention weights 310 and T-CAM outputs 320 in a video sequence 330 using the example models 100/200 according to example aspects of the present disclosure. As shown, the discriminative temporal regions can be highlighted by the attention weights 310 and T-CAMs 320 effectively. Note that some attention weights 310 may be large at the temporal regions that do not align with a target action, which can mean that such frames present other actions. This is expected as each attention weight 310 presents generic actionness of a segment instead of the likelihood for a specific action.

An I3D feature can be employed to compute frame-level representation. Using multiple streams of information such as RGB flows and optical flows has become a standard practice in action recognition and detection as it often provides a significant boost in performance. I3D is also based on a two-stream network, and we can train/learn two identical action recognition networks 130/140, as illustrated in FIG. 1; one is for RGB stream 115 and the other is for optical flow stream 120. The optical flow stream 120 can be computed from the RGB stream. Note that the I3D network can be used as a feature extraction machine without any fine-tuning. The two separately trained networks 130/140 can be fused to localize actions in an input video 110.

For example, relevant class labels 170 for an input video 110 can be identified based on video-level classification scores of the models (e.g., deep neural network) described herein. Temporal proposals 150, e.g., one dimensional time intervals, can be generated with their class labels and confidence scores. The temporal proposals 150 can correspond to video segments that potentially enclose target actions, and can be detected using T-CAMs in the example models described herein. Using two-stream models (e.g., convolutional neural network), such as shown in FIG. 1, the T-CAMs can be computed using Equation (4) for both streams, which can be denoted by $a_{t,RGB}^c$ and $a_{t,FLOW}^c$, from which the weighted T-CAMs, denoted by $\psi_{t,RGB}^c$ and $\psi_{t,FLOW}^c$ can be derived, as shown in Equations 5 and 6:

$$\psi_{t,RGB}^c = \lambda_{t,RGB} \cdot \text{sigmoid}(a_{t,RGB}^c) \qquad (5)$$

$$\psi_{t,FLOW}^c = \lambda_{t,FLOW} \cdot \text{sigmoid}(a_{t,FLOW}^c) \qquad (6)$$

Note that $\lambda_t$ is an element of the sparse vector (232) and multiplying by $\lambda_t$ can be interpreted as a soft selection of the values from the following sigmoid function. The weighted T-CAMs $\psi_{t,RGB}^c$ and $\psi_{t,FLOW}^c$ can be thresholded to segment the signals, and the temporal proposals 150 can be the one-dimensional connected components extracted from each stream.

Unlike the original CAM-based bounding box proposals, where only the largest bounding box is retained, all of the connected components that pass the predefined threshold can be kept. In some implementations, the weighted T-CAMS $\psi_{t,RGB}^c$ and $\psi_{t,FLOW}^c$ can be linearly interpolated between sampled segments before thresholding to improve the temporal resolution of the proposals 150 with minimal computation addition. Then, each proposal 150, defined by $[t_{start}; t_{end}]$, can be given a score for each class c, given by the weighted average T-CAM of all the frames within the proposal, as given by Equation (7):

$$\sum_{t=t_{start}}^{t_{end}} \lambda_{t,*} \frac{\alpha \cdot a_{t,RGB}^c + (1-\alpha) \cdot a_{t,FLOW}^c}{t_{end} - t_{start} + 1} \qquad (7)$$

where * ∈{RGB,FLOW} and a is a parameter to control the magnitudes of the two modality signals. This value corresponds to the temporal proposal score in each stream for class c. Finally, non-maximum suppression among temporal proposals of each class can be performed independently to remove highly overlapped detections.

The example models according to example aspects of the present disclosure can localize actions in untrimmed videos in the temporal domain by estimating sparse attention weights and T-CAMs for generic and specific actions, respectively. This approach is novel since it has a unique model architecture (e.g., deep neural network) with classification and sparsity losses and a completely different action localization procedure—through class-specific action proposals using T-CAMs—rather than a weakly supervised object detection technique.

The models, methods and systems disclosed herein were evaluated on two popular action detection benchmark datasets, THUMOS14, and ActivityNet1.3. Both datasets are untrimmed, meaning that there exist frames in videos that contain no target action, and no temporal annotations for action localization during training were exploited. In some instances, there may exist multiple actions in a single video and even in a single frame.

THUMOS14 dataset has 20 classes for action detection. An example model 100/200 according to example aspects of the present disclosure was trained using the validation set, composed of 200 untrimmed videos, where there exist many more action instances annotated with action labels and their temporal boundaries. However, note that training was performed without using the provided temporal annotations and evaluated on testing set with 213 videos. This dataset is challenging as some videos are relatively long (e.g., up to 26 minutes) and contain many action instances (e.g., up to 213 instances). The length of an action in the dataset varied significantly, from a few seconds to minutes.

The ActivityNet dataset is a recently introduced benchmark for action recognition and detection in untrimmed videos. ActivityNet1.3 was used for evaluation, which consists of 10,024 videos for training, 4,926 for validation, and 5,044 for testing of 200 activity classes. This dataset contains a large number of natural videos that involve various human activities into a semantic taxonomy.

For evaluation, the standard evaluation protocol was followed, which is based on mAP values at several different levels of intersection over union (IoU) thresholds. Both datasets provide benchmarking code for ActivityNet's Temporal Action Localization task. Accuracy on the test set of ActivityNet1.3 was obtained by submitting results to the evaluation server.

The two-stream I3D trained on the Kinetics dataset was employed to extract features 215 from individual video segments 205. For the RGB stream (e.g., 115 in FIG. 1), the smallest dimension of a frame was rescaled to 256 and a central crop of size 224×224 was performed. Other suitable input sizes could similarly be used. For the optical flow stream (e.g., 120 in FIG. 1), the TV-L1 optical flow algorithm was applied and the pixel values were truncated to be in [−20, 20]. Other suitable pixel values could similarly be used. A third channel of all 0 was added to the optical flow image. The input for I3D was a stack of 16 (RGB or optical flow) frames. To save space and processing time, the video was subsampled at 10 frames per second (fps). The network was trained using Adam optimizer with the starting learning rate at $1\times10^{-5}$. The balancing parameter between classification losses and sparsity losses, $\beta$, was set to $1\times10^{-5}$. The training process was stopped at 150K iterations. During training, as a form of data augmentation, multiple sets of segments were randomly selected from a single video. However, during testing, a fixed number of segments spanning equal temporal distance in the video were selected. In all experiments, 400 segments for both training and testing were used at a time. The example models according to example aspects of the present disclosure were implemented in Tensor-Flow.

Table 1 below summarizes the results on THUMOS14 dataset for all published action localization methods in the past two years. Both fully and weakly supervised approaches are included in the table, where the difference between two kinds of approaches lie in the level of supervision, especially annotations of action intervals in temporal domain; weakly supervised methods rely only on video-level action class labels to localize action instances temporally. As shown, the example models according to example aspects of the present disclosure outperform the other two techniques based on weakly supervised learning. Even with a significant difference in the level of supervision, the models disclosed herein present competitive performance compared to many recent fully supervised approaches.

TABLE 1

| Supervision | Method | AP@IoU | | | | | | | | |
| --- | --- | --- | --- | --- | --- | --- | --- | --- | --- | --- |
| | | 0.1 | 0.2 | 0.3 | 0.4 | 0.5 | 0.6 | 0.7 | 0.8 | 0.9 |
| Fully Supervised | Heilbron et al. | — | — | — | — | 13.5 | — | — | — | — |
| | Richard et al. | 39.7 | 35.7 | 30.0 | 23.2 | 15.2 | — | — | — | — |
| | Shou et al. | 47.7 | 43.5 | 36.3 | 28.7 | 19.0 | 10.3 | 5.3 | — | — |
| | Yeung et al. | 48.9 | 44.0 | 36.0 | 26.4 | 17.1 | — | — | — | — |
| | Yuan et al. | 51.4 | 42.6 | 33.6 | 26.1 | 18.8 | — | — | — | — |
| | Escordia et al. | — | — | — | — | 13.9 | — | — | — | — |
| | Shou et al. | — | — | 40.1 | 29.4 | 23.3 | 13.1 | 7.9 | — | — |
| | Yuan et al. | 51.0 | 45.2 | 36.5 | 27.8 | 17.8 | — | — | — | — |
| | Xu et al. | 54.5 | 51.5 | 44.8 | 35.6 | 28.9 | — | — | — | — |
| | Zhao et al. | 66.0 | 59.4 | 51.9 | 41.0 | 29.8 | — | — | — | — |
| | Alwasssel et al. | 49.6 | 44.3 | 38.1 | 28.4 | 19.8 | — | — | — | — |
| Weakly Supervised | Wang et al. | 44.4 | 37.7 | 28.2 | 21.1 | 13.7 | — | — | — | — |
| | Singh & Lee | 36.4 | 27.8 | 19.5 | 12.7 | 6.8 | — | — | — | — |
| | Present Disclosure | 52.0 | 44.7 | 35.5 | 25.8 | 16.9 | 9.9 | 4.3 | 1.2 | 0.1 |

As shown in Table 1, the present disclosure is compared with other techniques tested on the THUMOS14 database. The techniques are divided into two groups based on the level of supervision, and sorted chronologically from older to new techniques. The present disclosure presents state-of-the-art performance in a weakly supervised setting, approaching performance of many fully supervised approaches.

The example models according to example aspects of the present disclosure were also evaluated using the validation and testing sets of ActivityNet1.3 dataset. The results of this validation set and testing set are shown below in Tables 2 and 3, respectively.

TABLE 2

| | Method | AP@IoU | | |
| | | 0.5 | 0.75 | 0.95 |
|---|---|---|---|---|
| Fully Supervised | Singh & Cuzzonlin | 34.5 | — | — |
| | Wang & Tao | 45.1 | 4.1 | 0.0 |
| | Shou et al. | 45.3 | 26.0 | 0.2 |
| | Xiong et al. | 39.1 | 23.5 | 5.5 |
| | Montes et al. | 22.5 | — | — |
| | Xu et al. | 26.8 | — | — |
| Weakly Supervised | Present Disclosure | 29.3 | 16.9 | 2.6 |

As shown in Table 2, the present disclosure was compared on the ActivityNet 1.3 validation set to other techniques.

TABLE 3

| | Method | mAP |
|---|---|---|
| Fully Supervised | Singh & Cuzzonlin | 17.83 |
| | Wang & Tao | 14.62 |
| | Shou et al. | 26.05 |
| | Xiong et al. | 17.68 |
| | Montes et al. | 28.28 |
| Weakly Supervised | Present Disclosure | 20.07 |

As shown in Table 3, the present disclosure was compared on the ActivityNet 1.3 test set to other techniques.

Most of available action recognition results on the ActivityNet dataset were from the ActivityNet Challenge submission, and there did not appear to be many directly comparable techniques. Moreover, the present disclosure is believed to present the first attempt to evaluate weakly supervised action localization performance on this dataset. The results are reported results as a baseline for future reference.

Figure 4A:
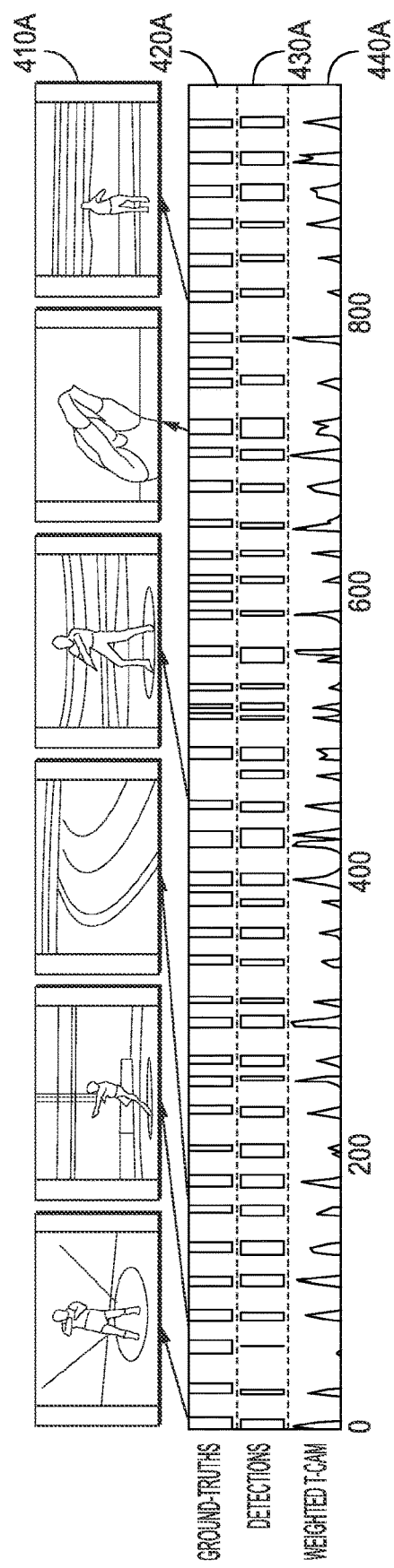
FIG. 4A depicts example groundtruth action instances along with prediction and a corresponding weighted temporal class activation map using one or more example models according to example aspects of the present disclosure.

The qualitative results in both datasets are demonstrated in FIG. 4. As mentioned herein, videos in THUMOS14 dataset are often long and contain many action instances, including from different categories. FIG. 4A shows an example with many action instances 410A along with the groundtruth 420A, detections (e.g., localized target action) 430A, and the corresponding weighted T-CAM 440A signals for the example models of the present disclosure.

Figure 4B:
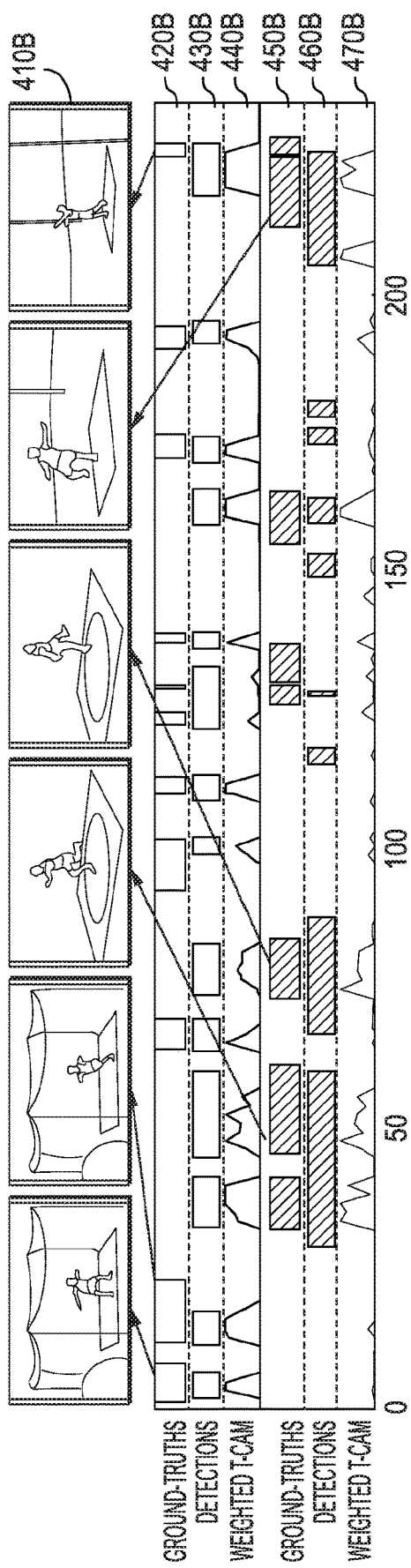
FIG. 4B depicts example videos containing groundtruth action instances from different classes along with prediction a corresponding weighted temporal class activation map using one or more example models according to example aspects of the present disclosure.

FIG. 4B illustrates an example of a video containing action instances 410B from different classes. Visually, the two involved action classes—discus throw (420B-440B) and shotput (450B-470B)—are similar in their appearance (green grass, person with blue shirt, standing on a gray platform) and motion patterns (circular throwing). The models according to example aspects of the present disclosure are able to not only localize the target actions but also classify the action categories successfully, despite several short term false positives.

Figure 4C:
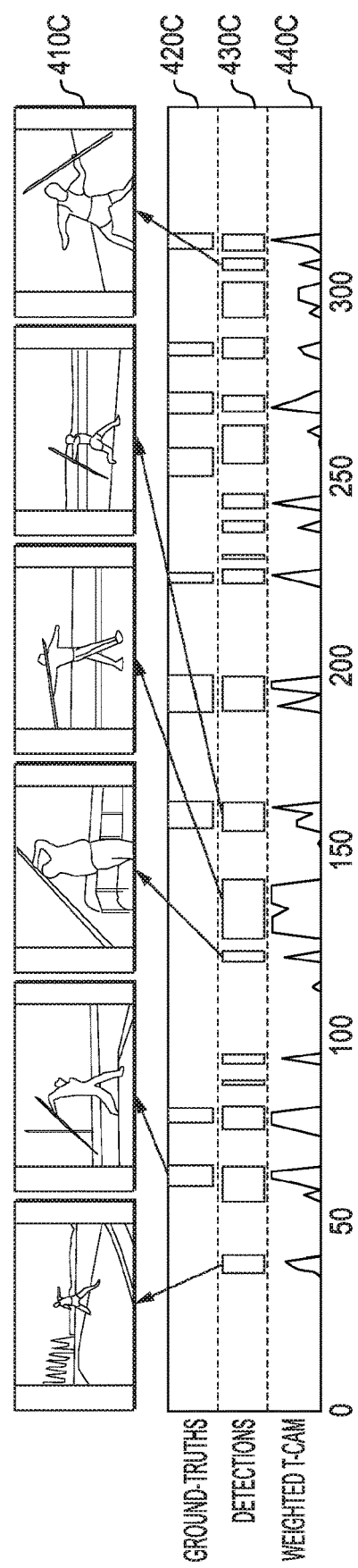
FIG. 4C depicts example groundtruth action instances along with prediction and a corresponding weighted temporal class activation map using one or more example model according to example aspects of the present disclosure.

FIG. 4C depicts an instructional video for a javelin throw (JavelinThrow) action 410C. The example models of the present disclosure are able to detect most of the groundtruth action 420C instances within the video; however, some false positives may be generated. Through further visual inspection, two causes for the false alarms have been observed. Many frames in FIG. 4C contain the scene for a javelin throw but the respective groundtruths 420C were often missing, which makes true detections 430C count as false positives. The second source of false positives were related to the segments in which the instructors demonstrate javelin throwing but only parts of such actions are visible in the segments. These segments resemble a real javelin throw action in both appearance and motion.

Further, the contribution of several components in the example weakly supervised models and implementation variations according to example aspects of the present disclosure were investigated. All these experiments were performed on the THUMOS14 dataset.

Figure 5:
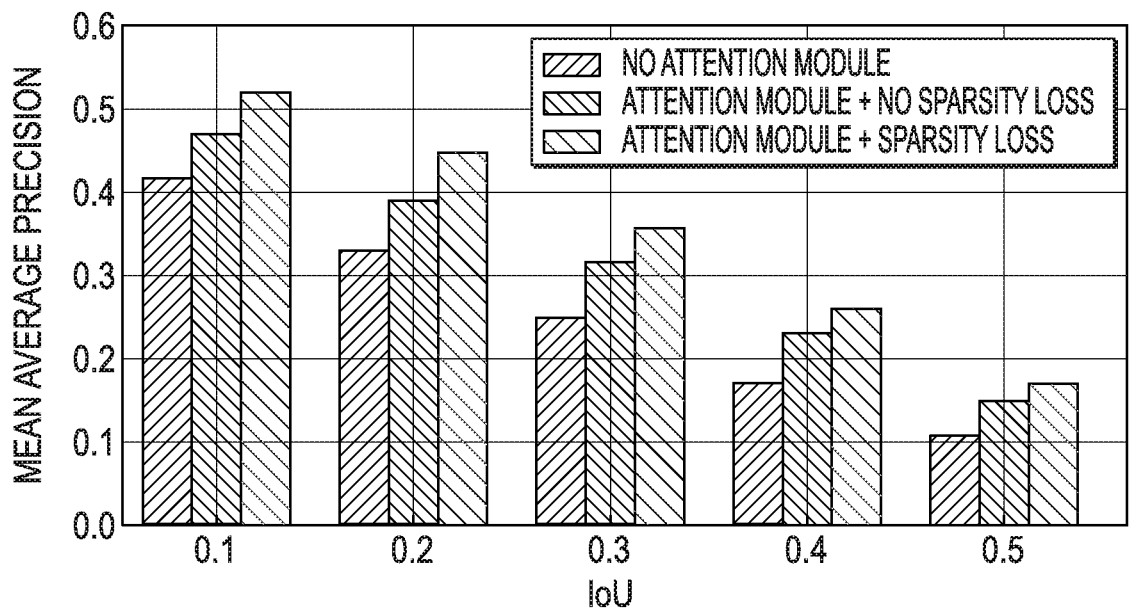
FIG. 5 depicts a graph showing performance of one or more example models according to example aspects of the present disclosure for different architecture choices.

The investigation evaluated whether an action can be recognized by a sparse subset of frames in a video. When the sparse temporal pooling network model according to example aspects of the present disclosure was trained, two loss terms—classification losses and sparsity losses—were employed. The baseline was the architecture without the attention module. FIG. 5 shows comparisons between the baselines of the present disclosure and a full model. Both the sparsity loss and attention weighted pooling were observed to make substantial contributions in performance improvement. As shown in FIG. 5, the attention module was shown to be useful as it allows the example models according to example aspects of the present disclosure to focus on the important parts on input videos. For example, enforcing the sparsity in action recognition via sparsity loss gave a significant boost in performance.

Figure 6:
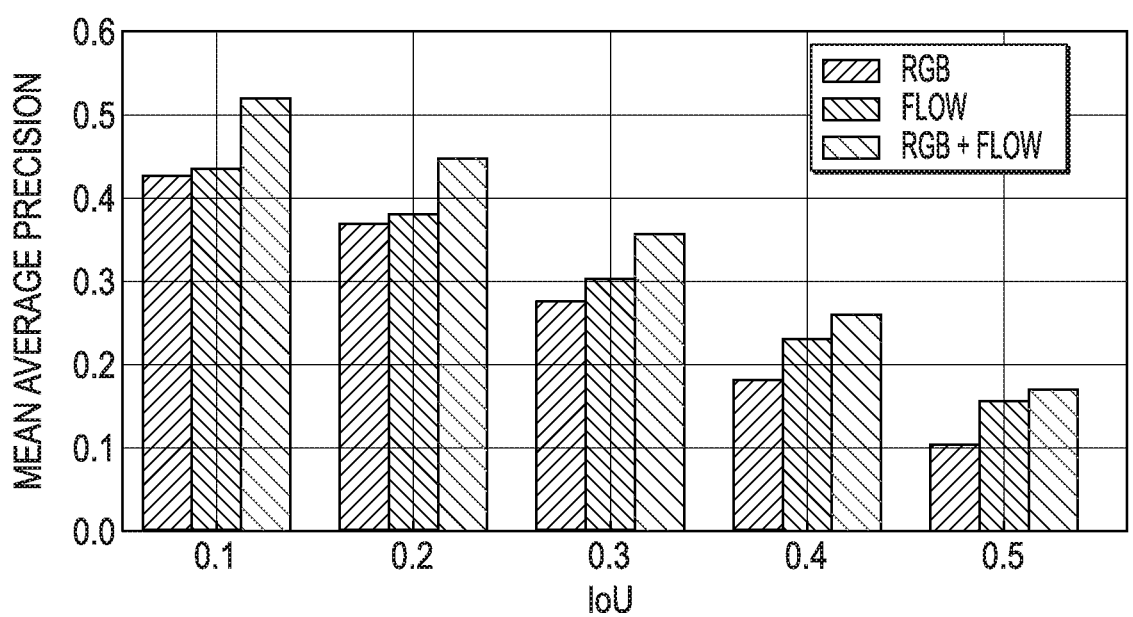
FIG. 6 depicts a graph showing a performance of one or more example models according to example aspects of the present disclosure for different feature choices.

As mentioned herein, the representation of each frame is based on a two-stream I3D network, which employs two sources of information; one is from RGB image and the other is from optical flow. FIG. 6 shows the effectiveness of each modality and their combination. As a single feature, the optical flow stream offers stronger performance than the RGB stream. Similar to action recognition, the combinations of the modalities provided significant performance improvement. For example, optical flow offered stronger cues than RGB for action localization, and a combination of the two features lead to significant improvements.

The example models according to example aspects of the present disclosure provide a weakly supervised action localization model and techniques, which can be based on deep neural networks with classification losses and sparsity losses. The classification can be performed by evaluating a video-level representation given by a sparse weighted mean of frame-level features, where the sparse coefficients are learned with sparsity loss. For weakly supervised action localization, one dimensional action proposals can be extracted first and relevant proposals to target classes can be selected to present time intervals of actions. The example models disclosed herein are more principled than previous models. For example, the models provided herein minimized heuristic components to improve quantitative performance. The proposed approach achieved the state-of-the-art accuracy on the THUMOS14 dataset, and new results on the AcitivityNet1.3 dataset were also demonstrated.

Example Devices and Systems

Figure 7A:
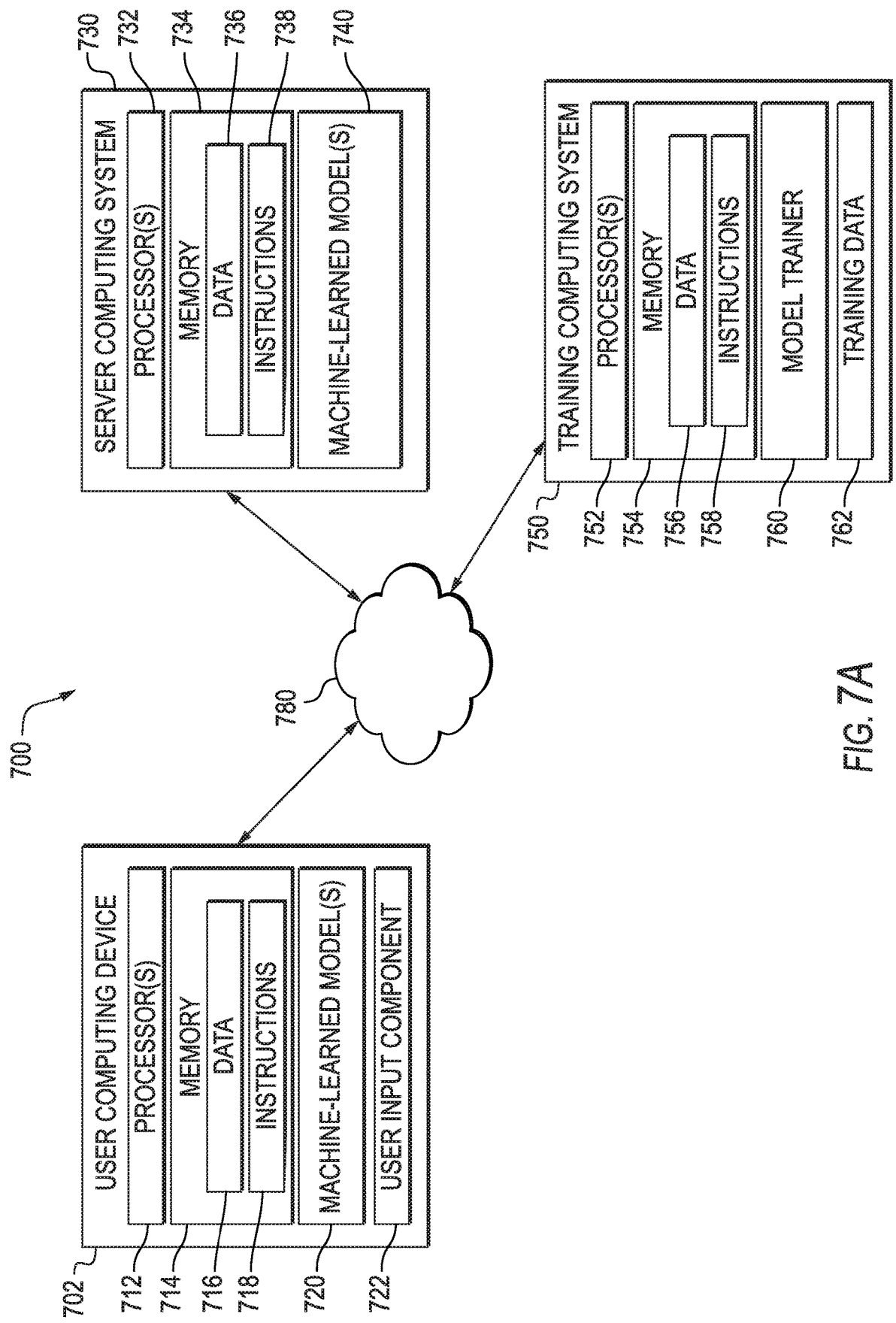
FIG. 7A depicts a block diagram of an example computing system that performs action classification and/or localization according to example aspects of the present disclosure.

FIG. 7A depicts a block diagram of an example computing system 700 that performs action classification and/or localization according to example aspects of the present disclosure. The system 700 includes a user computing device 702, a server computing system 730, and a training computing system 750 that are communicatively coupled over a network 780.

The user computing device 702 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 702 includes one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 and instructions 718 which are executed by the processor 712 to cause the user computing device 702 to perform operations.

In some implementations, the user computing device 702 can store or include one or more machine-learned models 720. For example, the machine-learned models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 720 are discussed with reference to FIGS. 1-2, and can include a sparse temporal pooling network, which includes two weakly supervised temporal action localization models, as disclosed herein.

In some implementations, the one or more machine-learned models 720 can be received from the server computing system 730 over network 780, stored in the user computing device memory 714, and then used or otherwise implemented by the one or more processors 712. In some implementations, the user computing device 702 can implement multiple parallel instances of a single machine-learned model 720 (e.g., to perform parallel action classification and/or localization).

More particularly, the one or more machine-learned models 720 can include one or more action classification and/or localization models. For example, the one or more machine-learned models 720 can include one or more weakly supervised temporal action localization models configured to localize and/or classify actions from untrimmed videos, as described herein. In some implementations, the one or more models can include one or more two-stream CNN models, such as a two-stream sparse temporal pooling network model for a RGB stream and an optical flow stream, as described herein.

Additionally or alternatively, one or more machine-learned models 740 can be included in or otherwise stored and implemented by the server computing system 730 that communicates with the user computing device 702 according to a client-server relationship. For example, the machine-learned models 740 can be implemented by the server computing system 740 as a portion of a web service (e.g., a video action classification and/or localization service). Thus, one or more models 720 can be stored and implemented at the user computing device 702 and/or one or more models 740 can be stored and implemented at the server computing system 730.

The user computing device 702 can also include one or more user input components 722 that receive user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 740 are discussed with reference to FIGS. 1-2.

The user computing device 702 and/or the server computing system 730 can train the models 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned models 720 and/or 740 stored at the user computing device 702 and/or the server computing system 730 using various training or learning techniques, such as, for example, backwards propagation of errors. In some implementations, performing backwards propagation of errors can include performing truncated backpropagation through time. The model trainer 760 can perform a number of generalization techniques (e.g., weight decays, dropouts, etc.) to improve the generalization capability of the models being trained.

In particular, the model trainer 760 can train the machine-learned models 720 and/or 740 based on a set of training data 762. The training data 762 can include, for example, video training datasets, such as the THUMOS14 validation set, as described herein. Other suitable training data sets can similarly be used. For example, the training data can include untrimmed videos containing a target action class that has been labelled with a video level action classification label.

In some implementations, if the user has provided consent, the training examples can be provided by the user computing device 702. Thus, in such implementations, the model 720 provided to the user computing device 702 can be trained by the training computing system 750 on user-specific data received from the user computing device 702. In some instances, this process can be referred to as personalizing the model.

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM hard disk or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 7A illustrates one example computing system that can be used to implement the present disclosure. Other computing systems can be used as well. For example, in some implementations, the user computing device 702 can include the model trainer 760 and the training dataset 762. In such implementations, the models 720 can be both trained and used locally at the user computing device 702. In some of such implementations, the user computing device 702 can implement the model trainer 760 to personalize the models 720 based on user-specific data.

Figure 7B:
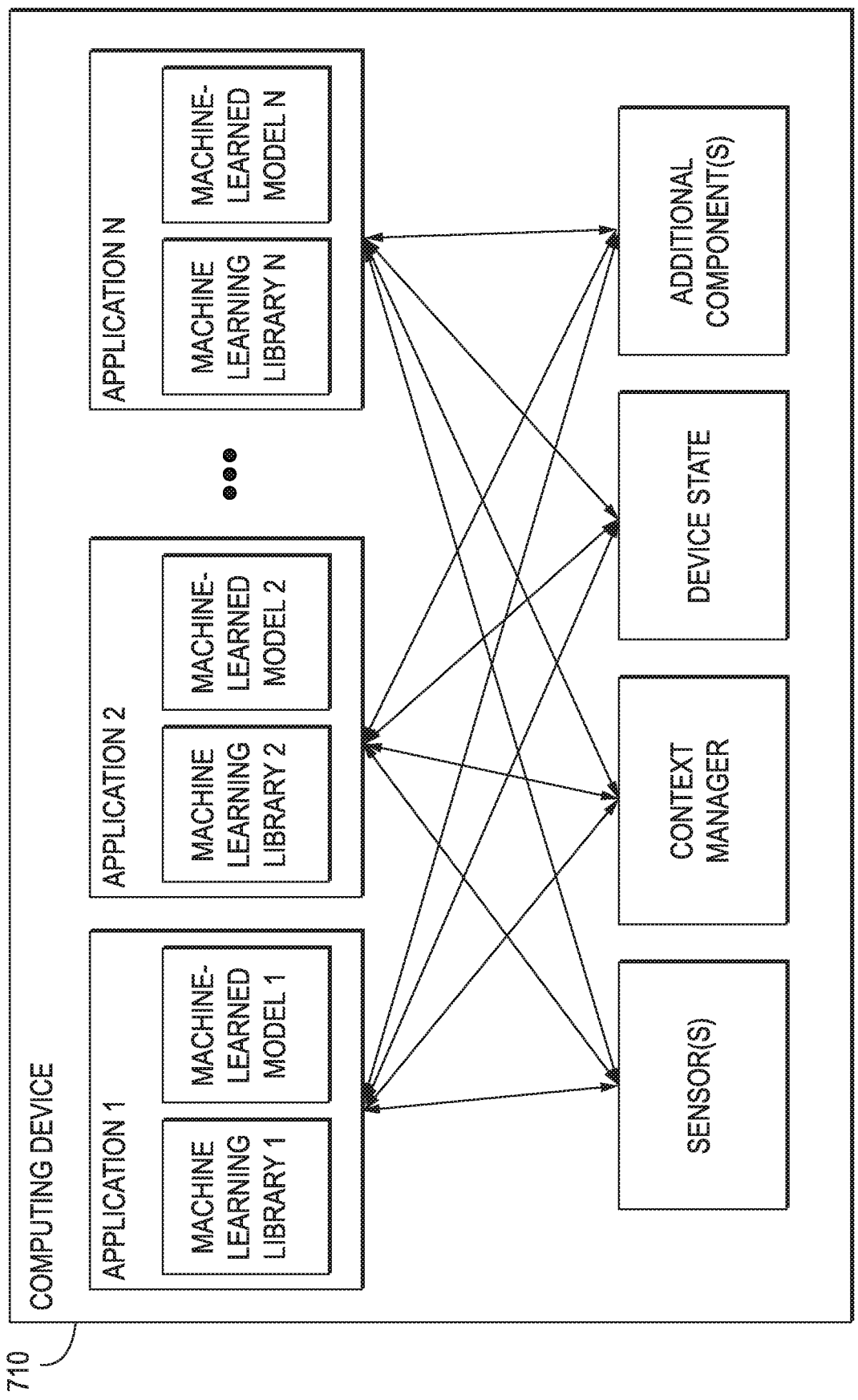
FIG. 7B depicts a block diagram of an example computing device that performs action classification and/or localization according to example aspects of the present disclosure.

FIG. 7B depicts a block diagram of an example computing device 710 that performs according to example aspects of the present disclosure. The computing device 710 can be a user computing device or a server computing device.

The computing device 710 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
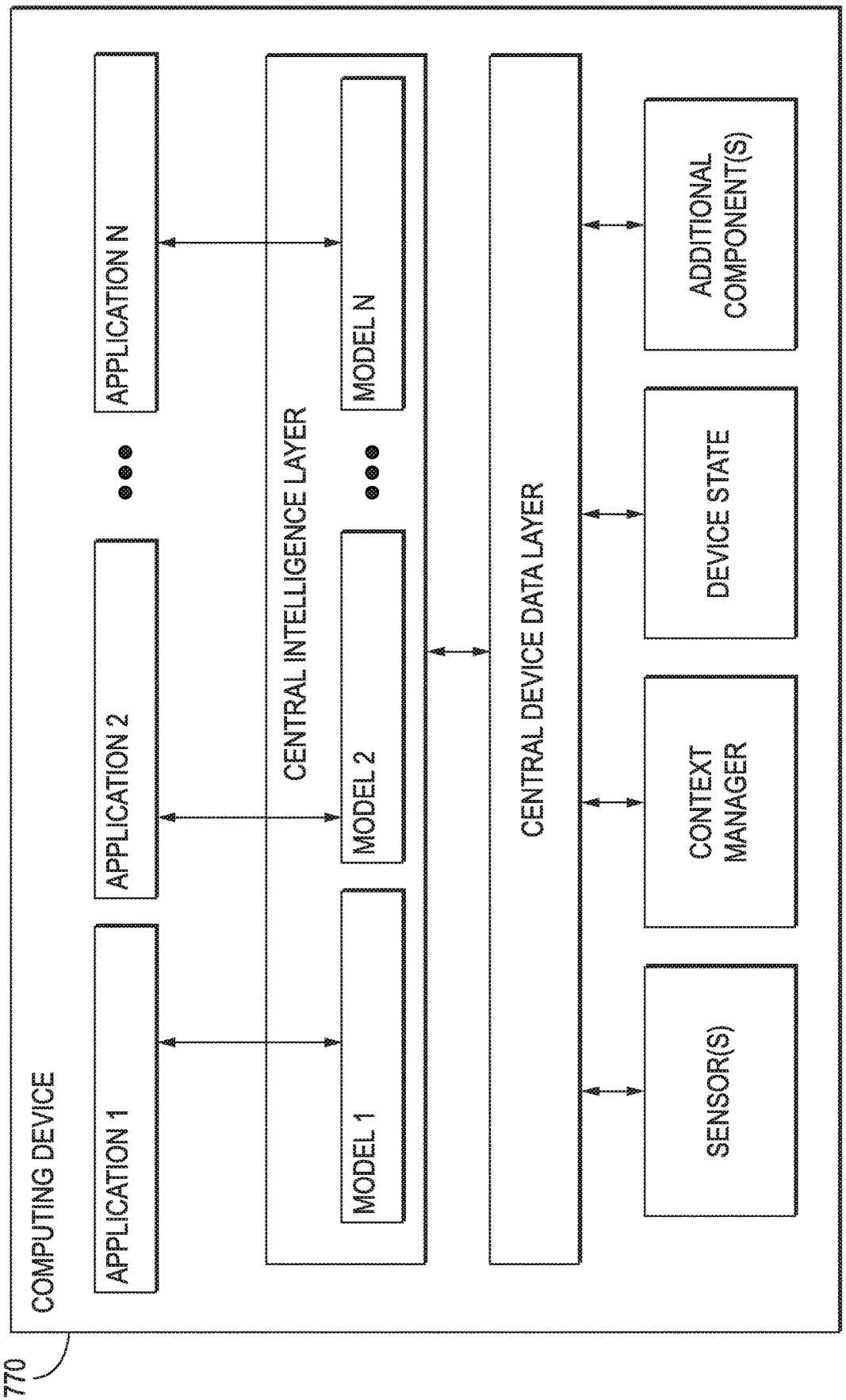
FIG. 7C depicts a block diagram of an example computing device that performs action classification and/or localization according to example aspects of the present disclosure.

FIG. 7C depicts a block diagram of an example computing device 770 that performs according to example aspects of the present disclosure. The computing device 770 can be a user computing device or a server computing device.

The computing device 770 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 770.

The central intelligence layer can communicate with a central device data layer. The central device data layer can be a centralized repository of data for the computing device 770. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 8:
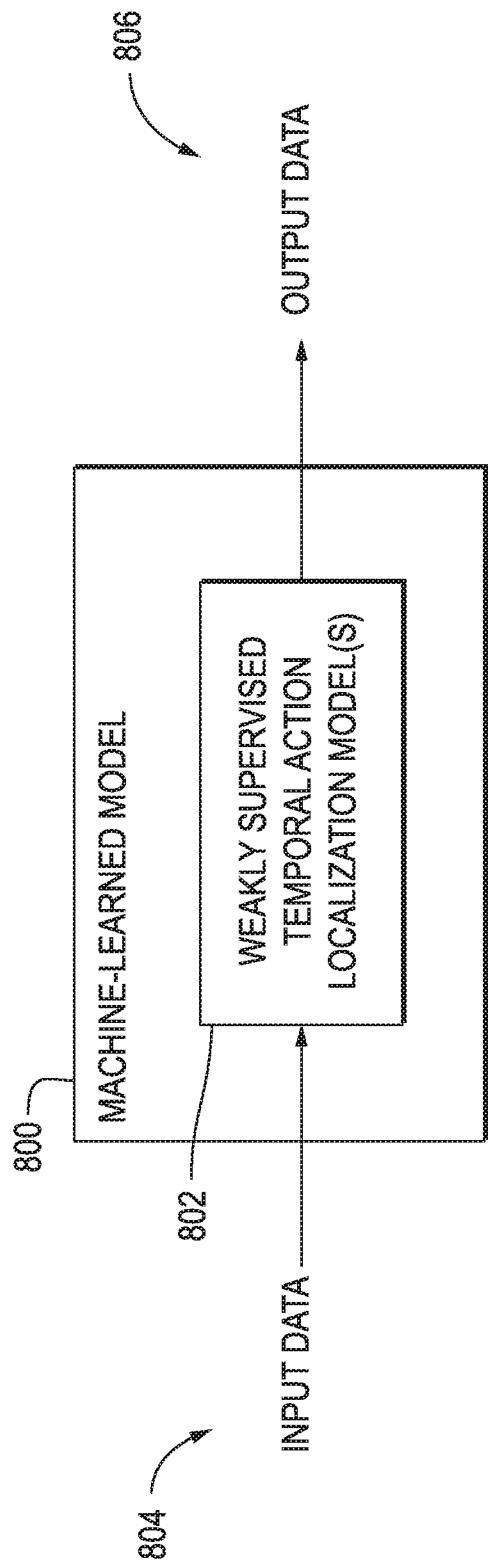
FIG. 8 depicts a block diagram of an example action classifier/localization model according to example aspects of the present disclosure.

FIG. 8 depicts a block diagram of an example machine-learned model 800 according to example aspects of the present disclosure. In some implementations, the machine-learned model 800 is trained to receive a set of input data 804 descriptive of a video (e.g., an untrimmed video) and, as a result of receipt of the input data 804, provide output data 806 that localizes and/or classifies one or more actions. Thus, in some implementations, the machine-learned model 800 can include one or more weakly supervised temporal action localization model(s) 802 that are operable to temporally localize action and/or classify such action(s), as described herein. In some implementations, the machine-learned model 800 can be a two-stream sparse temporal pooling network, which can include two weakly supervised temporal action localization models 802, as described herein.

Example Methods

Figure 9:
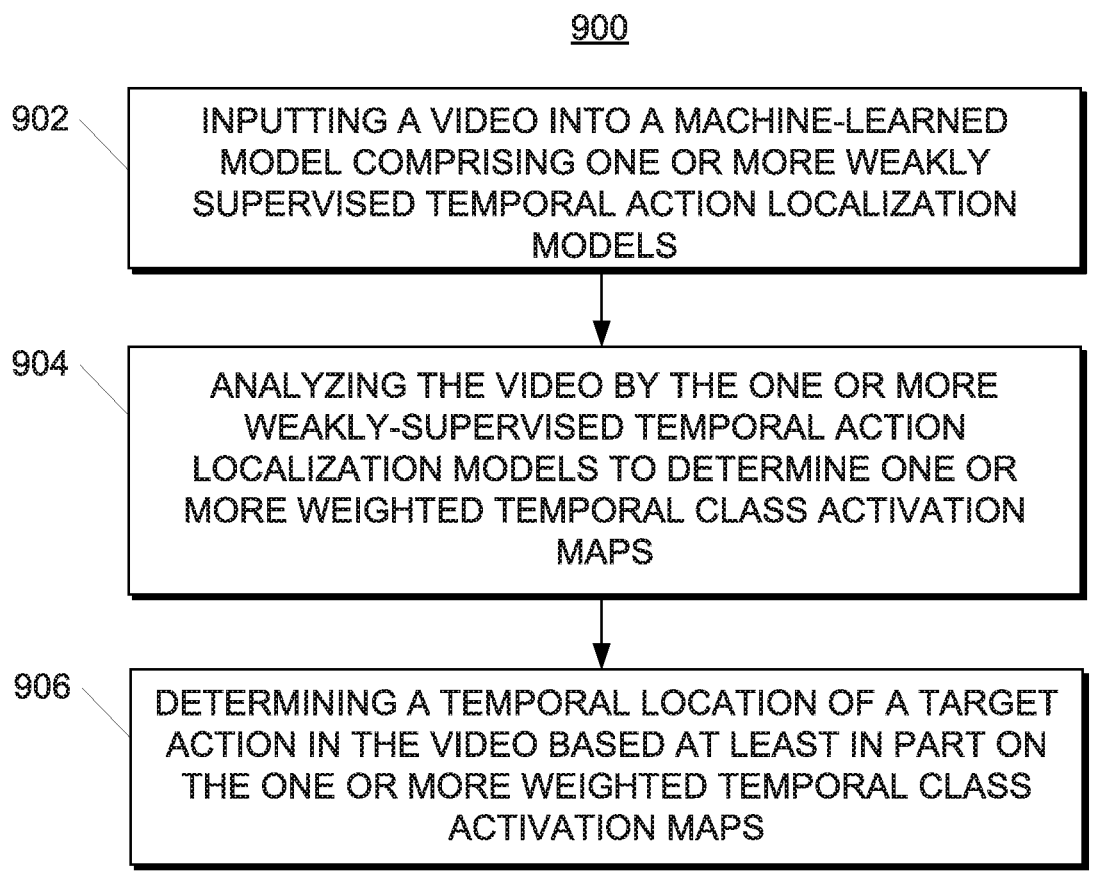
FIG. 9 depicts a flow chart diagram of an example method to perform action localization and/or classification according to example aspects of the present disclosure.

FIG. 9 depicts a flow chart diagram of an example method to temporally localize a target action according to example aspects of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a video can be input into a machine-learned model comprising one or more weakly supervised temporal action localization models. In some implementations, the video can include a RGB stream. In some implementations, the machine-learned model can be a sparse temporal pooling network, which can include two weakly supervised temporal action localization models. The machine-learned models can be implemented on a computing system, and the video can be data indicative of the video. For example, in some implementations, a user can use a user computing device 702 to select a video to be provided to machine-learned model 720. In some implementations, the machine-learned model 720 can be stored on the user computing device 702, and in other implementations, the machine-learned model 740 can be stored on a computing system 730 remote from the user computing device 702. The data can be, for example, data indicative of an untrimmed video.

At 904, the computing system can analyze the video by the one or more weakly-supervised temporal action localization models to determine one or more weighted temporal class activation maps. For example, the machine-learned model can include one or more weakly supervised temporal action localization models and/or a sparse temporal pooling network. In some implementations, the machine-learned model can be a two-stream model, wherein a first stream is a RGB stream and a second stream is an optical flow stream. The machine-learned model can be a machine-learned model configured to receive the video and output a weighted temporal class activation map.

At 906, the computing system can determine a temporal location of a target action in the video based at least in part on the one or more weighted temporal class activation maps. For example, the one or more temporal class activation maps can be thresholded to determine one or more temporal proposals, as provided herein. In some implementations, a first weighted temporal class activation map can be compared to a second weighted temporal class activation map, as provided herein. In some implementations, the output can include data indicative of an action classification and/or action localization. For example, the output from the machine-learned model can temporally locate an action and/or classify one or more target present in the video. In some implementations, the output of the machine-learned model can include both a temporal localization of an action as well as an action classification.

Figure 10:
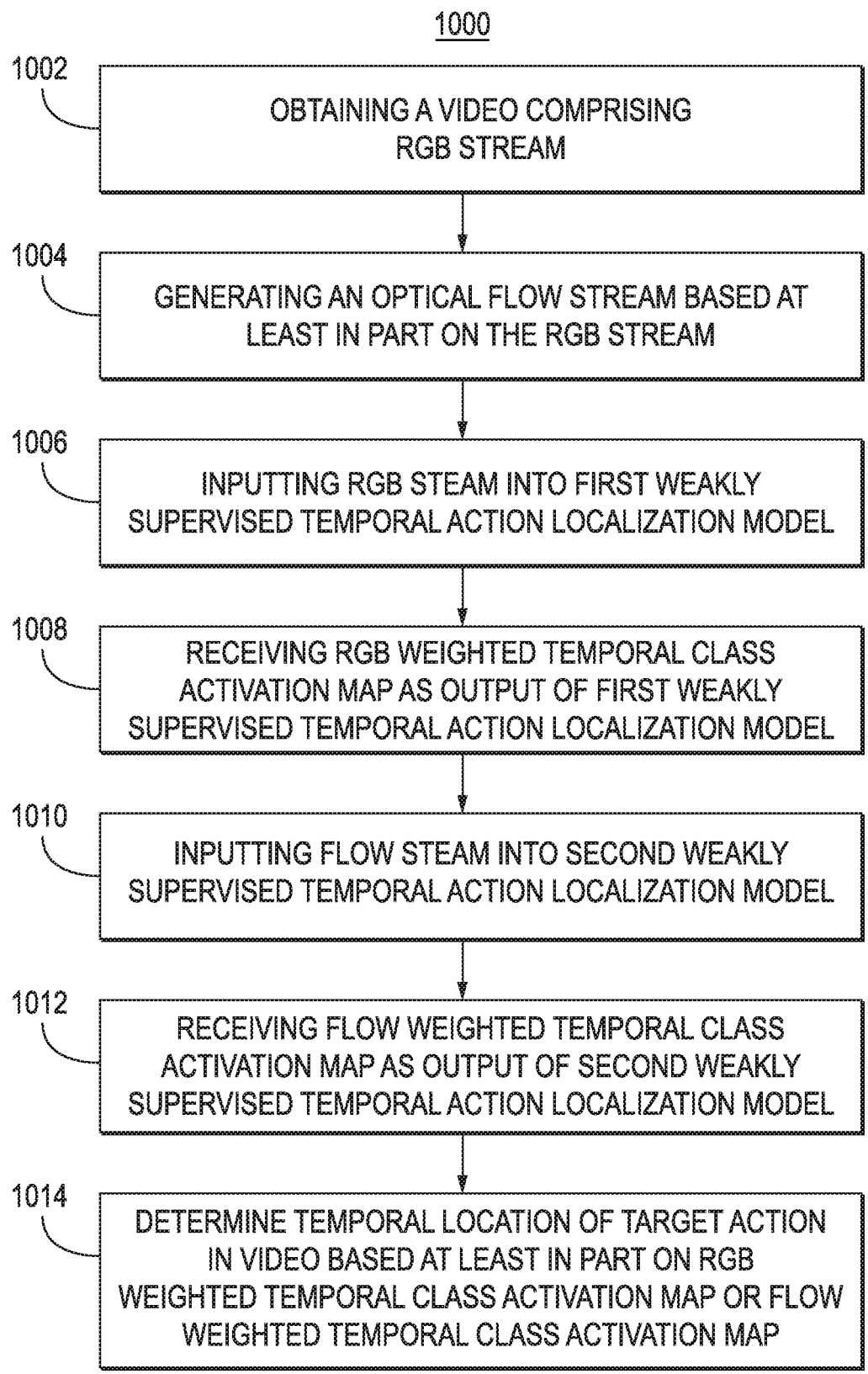
FIG. 10 depicts a flow chart diagram of an example method to temporally localize a target action in a video according to example aspects of the present disclosure.

FIG. 10 depicts a flow chart diagram of an example method to temporally localize a target action in a video according to example aspects of the present disclosure. The video can be, for example, an untrimmed video. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure. Method 1000 can be implemented by a computing system, such as one or more computing devices, as disclosed herein.

At 1002, the method 1000 can include obtaining a video comprising a RGB stream. For example, a sparse temporal pooling network comprising a first weakly supervised temporal action localization model and a second weakly supervised temporal action localization model can be implemented on a computing system. A user can provide the video to the sparse temporal pooling network, such as by inputting the video into the sparse temporal pooling network.

At 1004, the method 1000 can include generating an optical flow stream based at least in part on the RGB stream. For example, the sparse temporal pooling network can be configured to generate the optical flow stream from the RGB stream by performing an optical flow algorithm on the RGB stream.

At 1006, the method 1000 can include inputting the RGB stream into a first weakly supervised temporal action localization model. For example, the sparse temporal pooling network can be a two-stream network, and the RGB stream can be input into the first weakly supervised temporal action localization model.

At 1008, the method 1000 can include receiving a RGB weighted temporal class activation map as an output of the first weakly supervised temporal action localization model. For example, the first weakly supervised temporal action localization model can be trained to analyze the RGB stream to determine an RGB weighted temporal class activation map. The RGB weighted temporal class activation map can comprise a one-dimensional class-specific activation map in a temporal domain.

At 1010, the method 1000 can include inputting the optical flow stream into a second weakly supervised temporal action localization model. For example, the sparse temporal pooling network can be a two-stream network, and the optical flow stream can be input into the second weakly supervised temporal action localization model.

At 1012, the method 1000 can include receiving a flow weighted temporal class activation map as an output of the second weakly supervised temporal action localization model. For example, the second weakly supervised temporal action localization model can be trained to analyze the optical flow stream to determine a flow weighted temporal class activation map. The flow weighted temporal class activation map can comprise a one-dimensional class-specific activation map in a temporal domain.

At 1014, the method 1000 can include determining a temporal location of a target action in the video based at least in part on the RGB weighted temporal class activation map or the flow weighted temporal class activation map. For example, a sparse temporal pooling network can be configured to generate one or more class-specific temporal proposals for each of the RGB stream and the optical flow stream. Each class-specific temporal proposal can include one-dimensional connected components extracted from the RGB stream or the optical flow stream.

In some implementations, the one or more class-specific temporal proposals can be generated by the sparse temporal pooling network for each of the RGB stream and the optical flow stream by thresholding the RGB weighted temporal class activation map to segment the RGB stream or thresholding the flow weighted temporal class activation map to segment the optical flow stream. In some implementations, the one or more class-specific temporal proposals can be generated by linearly interpolating the RGB weighted temporal class activation map or the flow weighted temporal class activation map. For example, the weighted temporal class activation maps can be linearly interpolated between sampled segments before thresholding.

In some implementations, determining the temporal location of the target action in the video based at least in part on the RGB weighted temporal class activation map or the flow weighted temporal class activation map can include selecting a first class-specific temporal proposal for a particular time interval from either the RGB stream or the optical flow stream, and determining whether a second-class-specific temporal proposal for a corresponding time interval from the other stream exists. For example a first temporal proposal for a particular time interval can be selected from the RGB stream, and the sparse temporal pooling network can determine whether a second temporal proposal from the optical flow stream for a corresponding time interval exists. If not, the temporal location of the target action can be detected at the particular time interval based at least in part first class-specific temporal proposal. If a second-class-specific temporal proposal for the corresponding time interval from the other stream does exist, the sparse temporal pooling network can determine the temporal location of the target action in the video by comparing the first class-specific temporal proposal and the second-class-specific temporal proposal.

For example, a respective score for the target action can be determined for each of the first class-specific temporal proposal and the second-class-specific temporal proposal based at least in part on a weighted average temporal class activation map of all one-dimensional connected components within the respective class-specific temporal proposal. The temporal location of the target action can then be determined based at least in part on the respective scores. For example, the respective scores can be ranked, and the temporal proposal with the higher score can be used to determine the temporal location of the target action. In some implementations, the respective scores for the target classification can be determined based at least in part on a modality parameter. For example, the modality parameter can control the magnitude of the RGB weighted temporal class activation map and the flow weighted temporal class activation map.

In some implementations, determining the temporal location of the target action in the video can include performing non-maximum suppression among class-specific temporal proposals of a target classification to remove overlapped detections.

In some implementations, one or more relevant target action classes can first be determined by the sparse temporal pooling network by analyzing the video to determine one or more video-level classification scores. For example, the one or more video-level classification scores can determine which relevant target actions are present in the video, and target action localization can be performed on the relevant target actions.

In some implementations, the weakly supervised temporal action localization models of a sparse temporal pooling network can be trained using a loss function comprising a classification loss and a sparsity loss. For example, a classification loss can be determined based at least in part on a comparison of a video level classification score and a groundtruth classification. For example, multi-label cross-entropy loss between a groundtruth video-level action classification and a predicted score for an action classification can be performed. In some implementations, the sparsity loss can be determined based at least in part on determining a L1 (also referred to as $l_1$) norm of an attention weight parameter.

Figure 11:
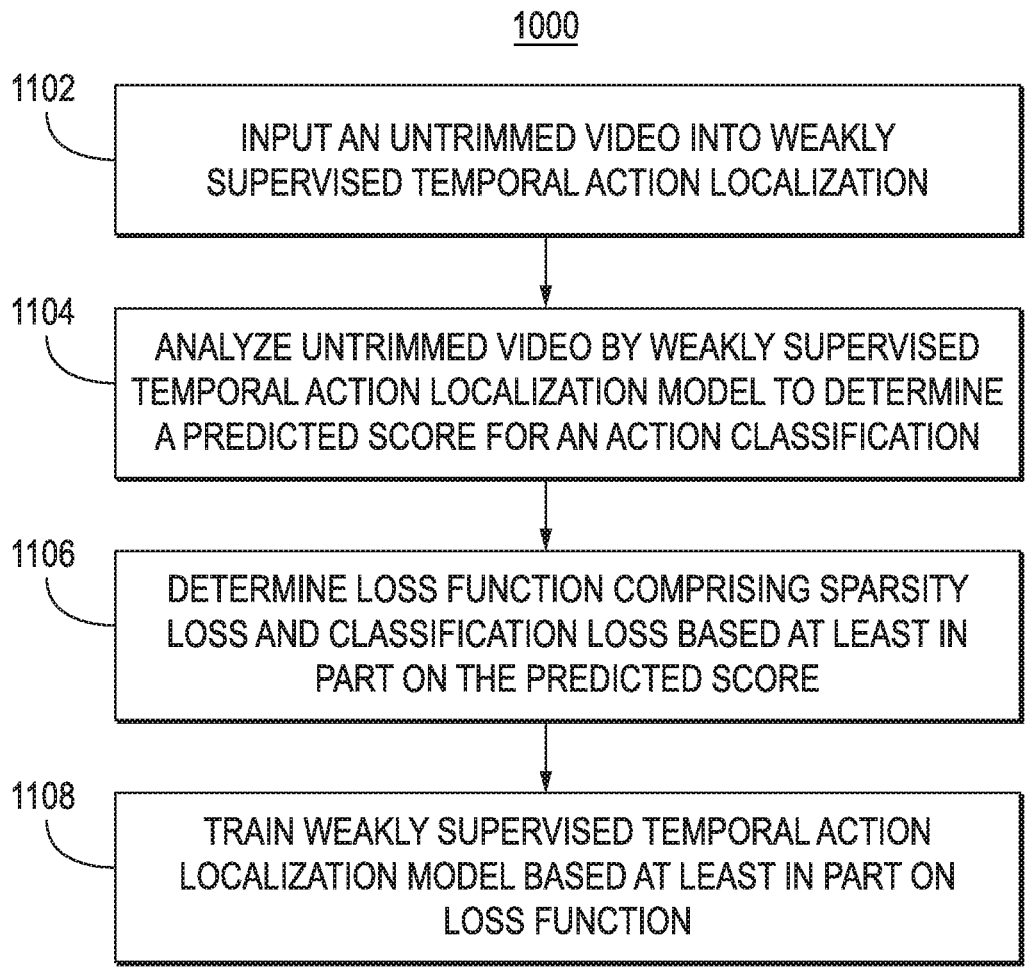
FIG. 11 depicts a flow chart diagram of an example method to train a weakly supervised temporal action localization model according to example aspects of the present disclosure.

FIG. 11 depicts a flow chart diagram of an example method to train a weakly supervised temporal action localization model according to example aspects of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure. Method 1100 can be implemented by a computing system, such as one or more computing devices, as disclosed herein.

At 1102, the method 1100 can include inputting an untrimmed video into a weakly supervised temporal action localization model.

At 1104, the method 1100 can include analyzing the untrimmed video by the weakly supervised temporal action localization model to determine a predicted score for an action classification.

For example, in some implementations, analyzing the untrimmed video can include sampling a plurality of segments from the untrimmed video. In some implementations, the plurality of segments can be uniformly sized. The plurality of segments can then each be analyzed with one or more pretrained convolutional neural networks to determine a respective feature representation.

In some implementations, each respective feature representation can then be input into an attention module to determine a respective attention weight. For example, in some implementations, the attention module can include two fully connected layers, a rectified linear unit layer between the two fully connected layers, and a sigmoid layer. Each feature representation can be input into the attention module, and the respective attention weight can be received from the sigmoid layer.

In some implementations, an attention weighted temporal average pooling can be determined based at least in part on the attention weights. For example, the attention weighted temporal average pooling can be a weighted sum of the feature representations multiplied by the respective attention weights.

In some implementations, the predicted score for the action classification can be determined based at least in part on the attention weighted temporal average pooling. For example, the attention weighted temporal average pooling can be input into a weighting parameter fully connected layer, and the output of the weighting parameter fully connected layer can be input into a sigmoid layer. The predicted score for the action classification can then be received from the sigmoid layer.

At 1106, the method 1100 can include determining a loss function comprising a sparsity loss and a classification loss based at least in part on the predicted score. For example, in some implementations, the classification loss can be determined based at least in part on a comparison of the predicted score for the action classification and a ground truth video-level action classification. For example, the classification loss can be determined using a multi-label cross-entropy loss between the groundtruth video-label and the predicted score for the action classification. In some implementations, the sparsity loss can be determined based at least in part on a L1 norm (also referred to as $l_1$) of one or more attention weights received from the attention module.

At 1108, the method 1100 can include training the weakly supervised temporal action localization model based at least in part on the loss function.

For example, in some implementations, a weighting parameter fully connected layer of the weakly supervised temporal action localization model can be trained based at least in part on the classification loss. In some implementations, the attention module can be trained based at least in part on the sparsity loss. For example, the two fully connected layers of an attention module can be trained based at least in part on the sparsity loss.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example aspects thereof, each example is provided by way of explanation, not limitation of the disclosure. Those skilled in the art, upon attaining an understanding of the foregoing, can readily produce alterations to, variations of, and equivalents to such aspects. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for temporally localizing a target action in a video, comprising:
    inputting a video into a machine-learned model comprising one or more weakly supervised temporal action localization models;
    analyzing the video by the one or more weakly-supervised temporal action localization models to determine one or more weighted temporal class activation maps; each temporal class activation map comprising a one dimensional class-specific activation map in a temporal domain; and
    determining a temporal location of a target action in the video based at least in part on the one or more weighted temporal class activation maps;
    wherein the machine-learned model comprises a sparse temporal pooling network comprising a first weakly supervised temporal action localization model and a second weakly supervised temporal action localization model.

2. The computer-implemented method of claim 1, further comprising:
    generating an optical flow stream based at least in part on the video; and
    wherein inputting the video into the machine-learned model comprising one or more weakly supervised temporal action localization models comprises:
    inputting the video into the first weakly supervised temporal action localization model, and;
    inputting the optical flow stream into the second weakly supervised temporal action localization model.

3. The computer-implemented method of claim 2, wherein analyzing the video by the one or more weakly-supervised temporal action localization models to determine the one or more weighted temporal class activation maps comprises:
    analyzing the video by the first weakly-supervised temporal action localization model to determine a first weighted temporal class activation map comprising a first one dimensional class-specific activation map in the temporal domain; and
    analyzing the optical flow stream by the second weakly-supervised temporal action localization model to determine a second weighted temporal class activation map comprising a second one dimensional class-specific activation map in the temporal domain.

4. The computer-implemented method of claim 3, wherein determining the temporal location of the target action in the video based at least in part on the one or more weighted temporal class activation maps comprises:
    determining the temporal location of the target action in the video based at least in part on the first weighted temporal class activation map and the second weighted temporal class activation map.

5. The computer-implemented method of 4, wherein determining the temporal location of the target action in the video based at least in part on the one or more weighted temporal class activation maps comprises:
    generating one or more class-specific temporal proposals for each of the video and the optical flow stream, each class-specific temporal proposal comprising one-dimensional connected components extracted from the video or the optical flow stream.

6. The computer-implemented method of claim 5, wherein generating the one or more class-specific temporal proposals for each of the video and the optical flow stream comprises thresholding the first weighted temporal class activation map to segment the video into a first set of one or more class-specific proposals and thresholding the second weighted temporal class activation map to segment the optical flow stream into a second set of one or more class-specific temporal proposals.

7. The computer-implemented method of claim 5, wherein generating the one or more class-specific temporal proposals comprises linearly interpolating one or more of the first weighted temporal class activation map and the second weighted temporal class activation map.

8. The computer-implemented method of claim 5, wherein determining the temporal location of the target action in the video based at least in part on the first weighted temporal class activation map and the second weighted temporal class activation map comprises:
    selecting a first class-specific temporal proposal for a particular time interval from either the video or the optical flow stream; and
    determining whether a second class-specific temporal proposal for a corresponding time interval from the other of the video or the optical flow stream exists.

9. The computer-implemented method of claim 8, wherein when a second class-specific temporal proposal for the corresponding time interval from the other of the video or the optical flow stream does not exist, determining the temporal location of the target action in the video based at least in part on the first weighted temporal class activation map and the second weighted temporal class activation map comprises detecting the target action at the particular time interval based at least in part on the first class-specific temporal proposal.

10. The computer-implemented method of claim 8, wherein when a second class-specific temporal proposal for the corresponding time interval from the other of the video or the optical flow stream does exist, determining the temporal location of the target action in the video based at least in part on the first weighted temporal class activation map and the second weighted temporal class activation map comprises comparing the first class-specific temporal proposal and the second class-specific temporal proposal.

11. The computer-implemented method of claim 10, wherein comparing, by the sparse temporal pooling network, the first class-specific temporal proposal and the second class-specific temporal proposal comprises determining a respective score for the target action for each of the first class-specific temporal proposal and the second class-specific temporal proposal based at least in part on a weighted average temporal class activation map of all one dimensional connected components within the respective class-specific temporal proposal.

12. The computer-implemented method of claim 11, wherein the temporal location of the target action in the video is determined based at least in part on the respective scores.

13. The computer-implemented method of claim 11, wherein the respective scores for the target action are determined based at least in part on a modality parameter to control a magnitude of the first weighted temporal class activation map and the second weighted temporal class activation map.

14. The computer-implemented method of claim 1, further comprising:
determining one or more relevant target action class labels for the video based at least in part on a video-level classification score.

15. The computer-implemented method of claim 1, wherein the one or more weakly supervised temporal action localization models have been trained using a training dataset comprising untrimmed videos labelled with video-level class labels of target actions.

16. The computer-implemented method of claim 1, wherein the one or more weakly supervised temporal action localization models have been trained using a loss function comprising a classification loss and a sparsity loss.

17. The computer-implemented method of claim 16, wherein the classification loss is determined based at least in part on a comparison of a video-level classification score and a groundtruth classification.

18. The computer-implemented method of claim 16, wherein the sparsity loss is determined based at least in part on a L1 norm of an attention weight parameter.

19. A computer-implemented method for temporally localizing a target action in a video, comprising:
inputting a video into a machine-learned model comprising one or more weakly supervised temporal action localization models;
analyzing the video by the one or more weakly-supervised temporal action localization models to determine one or more weighted temporal class activation maps; each temporal class activation map comprising a one dimensional class-specific activation map in a temporal domain; and
determining a temporal location of a target action in the video based at least in part on the one or more weighted temporal class activation maps, wherein determining the temporal location of the target action in the video based at least in part on the one or more weighted temporal class activation maps comprises performing non-maximum suppression among a plurality of class-specific temporal proposals of the target classification to remove overlapped detections.

20. A computer-implemented method of training a weakly supervised temporal action localization model, comprising:
for each weakly supervised temporal action localization model of a plurality of weakly supervised temporal action localization models of a sparse temporal pooling network:
inputting an untrimmed video into the weakly supervised temporal action localization model;
analyzing the untrimmed video by the weakly supervised temporal action localization model to determine a predicted score for an action classification;
determining a loss function based at least in part on the predicted score, the loss function comprising a sparsity loss and a classification loss; and
training the weakly supervised temporal action localization model based at least in part on the loss function.

21. The computer-implemented method of claim 20, wherein analyzing the untrimmed video by the weakly supervised temporal action localization model to determine a predicted score for an action classification comprises:
sampling a plurality of segments from the untrimmed video; and
analyzing each of the plurality of segments with one or more pretrained convolutional neural networks to determine a respective feature representation.

22. The computer-implemented method of claim 21, wherein analyzing the untrimmed video by the weakly supervised temporal action localization model to determine a predicted score for an action classification comprises:
inputting each respective feature representation into an attention module to determine a respective attention weight.

23. The computer-implemented method of claim 22, wherein the attention module comprises a first fully connected layer, a rectified linear unit layer, a second fully connected layer, and a sigmoid layer.

24. The computer-implemented method of claim 23, wherein analyzing the untrimmed video by the weakly supervised temporal action localization model to determine a predicted score for an action classification comprises:
determining an attention weighted temporal average pooling comprising a weighted sum of the feature representations multiplied by the respective attention weights; and
wherein the predicted score for the action classification is determined based at least in part on the attention weighted temporal average pooling.

25. The computer-implemented method of claim 24, wherein analyzing the untrimmed video by the weakly supervised temporal action localization model to determine a predicted score for an action classification comprises:
inputting the attention weighted temporal average pooling into a weighting parameter fully connected layer;
inputting an output of the weighting parameter fully connected layer into a sigmoid layer; and
receiving the predicted score for the action classification from the sigmoid layer.

26. The computer-implemented method of claim 20, wherein_determining the classification loss comprises determining a multi-label cross-entropy loss between a groundtruth video-level action classification and the predicted score for the action classification.

27. The computer-implemented method of claim 20, wherein determining the sparsity loss comprises determining the sparsity loss based at least in part on a L1 norm of one or more attention weights received from an attention module of the weakly supervised temporal action localization model.

28. A computing system, comprising:
    at least one processor;
    a sparse temporal pooling network comprising:
        a first weakly supervised temporal action localization model, wherein the first weakly supervised temporal action localization model is trained to receive a video comprising a RGB stream and, in response to receipt of the RGB stream, output a RGB weighted temporal class activation map comprising a one dimensional class-specific activation map in a temporal domain; and
        a second weakly supervised temporal action localization model, wherein the second weakly supervised temporal action localization model is trained to receive an optical flow stream of the video and in response to receipt of the optical flow stream,
    output a flow weighted temporal class activation map comprising a one dimensional class-specific activation map in a temporal domain; and
    at least one tangible, non-transitory computer-readable medium that stores instructions that, when executed by the at least one processor, cause the at least one processor to perform operations, the operations comprising:
        obtaining the video;
        generating the optical flow stream based at least in part on the RGB stream;
        inputting the RGB stream into the first weakly supervised temporal action localization model;
        receiving, as an output of the first weakly supervised temporal action localization model, the RGB weighted temporal class activation map;
        inputting the optical flow stream into the second weakly supervised temporal action localization model;
        receiving, as an output of the second weakly supervised temporal action localization model, the flow weighted temporal class activation map; and
        determining a temporal location of a target action in the video based at least in part on the RGB weighted temporal class activation map or the flow weighted temporal class activation map.

* * * * *